United States Patent
Rico Alvarino et al.

(10) Patent No.: US 10,178,612 B2
(45) Date of Patent: Jan. 8, 2019

(54) ENHANCED MACHINE-TYPE COMMUNICATIONS CELL ACQUISITION USING NARROW BAND SYNCHRONIZATION CHANNEL

(71) Applicant: QUALCOMM Incorporated, San Diego, CA (US)

(72) Inventors: Alberto Rico Alvarino, San Diego, CA (US); Xiao feng Wang, San Diego, CA (US); Hao Xu, San Diego, CA (US); Peter Gaal, San Diego, CA (US); Wanshi Chen, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 125 days.

(21) Appl. No.: 15/476,155

(22) Filed: Mar. 31, 2017

(65) Prior Publication Data
US 2017/0311250 A1    Oct. 26, 2017

Related U.S. Application Data

(60) Provisional application No. 62/327,988, filed on Apr. 26, 2016.

(51) Int. Cl.
| | |
|---|---|
| *H04W 48/20* | (2009.01) |
| *H04W 72/04* | (2009.01) |
| *H04W 48/18* | (2009.01) |
| *H04W 4/70* | (2018.01) |
| *H04W 88/06* | (2009.01) |

(52) U.S. Cl.
CPC ............. *H04W 48/20* (2013.01); *H04W 4/70* (2018.02); *H04W 48/18* (2013.01); *H04W 72/0453* (2013.01); *H04W 88/06* (2013.01)

(58) Field of Classification Search
CPC ........ H04W 48/20; H04W 72/04; H04W 4/00
See application file for complete search history.

(56) References Cited

U.S. PATENT DOCUMENTS

| | | | |
|---|---|---|---|
| 9,001,778 B2 * | 4/2015 | Chin .................. | H04W 56/001 370/329 |
| 9,319,863 B2 | 4/2016 | Peruru et al. | |
| 2007/0211669 A1 | 9/2007 | Umatt et al. | |
| 2016/0234736 A1 | 8/2016 | Kubuta et al. | |
| 2016/0234826 A1 | 8/2016 | Chen et al. | |

(Continued)

OTHER PUBLICATIONS

Ericsson, "Support of NB-IoT and eMTC in the Same Cell," 3GPP TSG RAN WG1 Meeting #84, R1-160257, St. Julian's, Malta, Feb. 15-19, 2016, 4 pgs., XP051064075, 3rd Generation Partnership Project, Sophia-Antipolis Cedex, France.

(Continued)

*Primary Examiner* — Zhiren Qin
(74) *Attorney, Agent, or Firm* — Holland & Hart LLP

(57) ABSTRACT

Methods, systems, and devices for wireless communication are described for utilizing narrow band (NB) synchronization channel(s) for enhanced machine-type communications (eMTC) cell acquisition. The methods, systems, and devices may perform a first portion of cell acquisition using an NB acquisition signal. A second portion of cell acquisition may be performed using an eMTC acquisition signal determined based at least in part on the acquisition signal.

24 Claims, 20 Drawing Sheets

(56) References Cited

U.S. PATENT DOCUMENTS

| | | | |
|---|---|---|---|
| 2016/0295529 A1 | 10/2016 | Rico Alvarino et al. | |
| 2017/0251372 A1* | 8/2017 | Belghoul | H04W 16/14 |
| 2017/0265066 A1* | 9/2017 | Vyas | H04W 8/18 |
| 2017/0289965 A1* | 10/2017 | You | H04W 56/001 |
| 2018/0020462 A1* | 1/2018 | Xiong | H04W 72/1215 |
| 2018/0145819 A1* | 5/2018 | Axmon | H04W 4/70 |
| 2018/0184390 A1* | 6/2018 | Wu | H04W 4/70 |
| 2018/0192469 A1* | 7/2018 | Rathonyi | H04W 72/14 |

OTHER PUBLICATIONS

ISA/EP, International Search Report and Written Opinion of the International Searching Authority, Int'l Application No. PCT/US2017/025771, dated Sep. 5, 2017, European Patent Office, Rijswijk, NL, 30 pgs.

Panasonic, "Commonality Design Between eMTC and NB-IOT," 3GPP TSG RAN WG1 Meeting #82bis, R1-155776, Malmo, Sweden, Oct. 5-9, 2015, 5 pgs., XP051041871, 3rd Generation Partnership Project, Sophia-Antipolis Cedex, France.

ISA/EPO, Partial International Search Report of the International Searching Authority, Int'l. App. No. PCT/US2017/025771, dated Jul. 14, 2017, European Patent Office, Rijswijk, NL, 21 pgs.

QUALCOMM Incorporated, "Reduced System Acquisition Time," 3GPP TSG RAN WG1 Meeting #88bis, R1-1705011, Spokane, USA, Apr. 3-7, 2017, 3 pgs., XP051251686, 3rd Generation Partnership Project, Sophia-Antipolis Cedex, France.

\* cited by examiner

ENHANCED MACHINE-TYPE COMMUNICATIONS CELL ACQUISITION USING NARROW BAND SYNCHRONIZATION CHANNEL

CROSS REFERENCES

The present Application for Patent claims priority to U.S. Provisional Patent Application No. 62/327,988 by Rico Alvarino, et al., entitled "Enhanced Machine-Type Communications Cell Acquisition Using Narrow Band Synchronization Channel," filed Apr. 26, 2016, assigned to the assignee hereof.

BACKGROUND

The following relates generally to wireless communication, and more specifically to enhanced machine-type communications (eMTC) cell acquisition using a narrow band (NB) synchronization channel.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

Some wireless communications systems may include base stations that support multiple device type deployments. For example, in eMTC and NB-Internet of Things (NB-IoT) deployments, mobile devices may communicate with a base station (or other serving station) using resources allocated specifically for one deployment or the other. A synchronization procedure between a mobile device and a base station may be performed in order for the mobile station to acquire and attach to a particular cell served by the base station. As different synchronization techniques and signals may be utilized in each deployment, the time for acquiring a cell may vary depending on whether the device is attempting to acquire a cell supporting eMTC or NB-IoT. Longer cell acquisition times may decrease device performance and in low signal to noise ratio (SNR) environments, communication between the mobile device and the base station may be deleteriously affected.

SUMMARY

In a wireless communications system, an enhanced machine-type communications (eMTC) deployment may provide resource flexibility, channel quality feedback information, and frequency diversity when compared to a narrow band internet-of-things (NB-IoT) deployment, but may take a longer time during cell acquisition. While eMTC provides numerous benefits, an NB-IoT deployment may support a higher maximum coupling loss (MCL) and synchronization signals for cell acquisition may support power boosting. As a result, in low signal to noise ratio (SNR) environments cell acquisition may be performed faster in an NB-IoT deployment compared to an eMTC deployment.

In some instances, NB-IoT and eMTC may be deployed in the same cell and a mobile device operating within the coverage area of the cell may support both eMTC and NB-IoT. In such cases, to reduce cell acquisition time, a device wishing to communicate using eMTC may utilize NB-IoT synchronization signals for synchronization or to obtain system information for operating in eMTC. The described techniques relate to improved methods, systems, devices, or apparatuses that are configured for cell acquisition for a first wireless protocol type (e.g., eMTC) to perform at least a portion of the cell acquisition procedure using a synchronization channel associated with a second, different wireless protocol type (e.g., NB-IoT).

A method of wireless communication is described. The method may include selecting, by a user equipment (UE) configured for cell acquisition for a first wireless protocol type using acquisition signals transmitted by deployments of the first wireless protocol type, to search for acquisition signals associated with a second wireless protocol type. In some cases, the method may further include, receiving, from a base station, a first acquisition signal of a deployment of the second wireless device protocol type, wherein the deployment of the second wireless protocol type is frequency and time coupled with a deployment of the first wireless protocol type, performing a first portion of cell acquisition for a cell associated with the first wireless protocol type based at least in part on the first acquisition signal. Furthermore, in some cases, the method may include, receiving a second signal associated with the cell of the deployments of the first wireless protocol type transmitted in resources determined based at least in part on the first portion of the cell acquisition, obtaining system information of the cell of the deployment of the first wireless protocol type based at least in part on the received second signal, and completing the cell acquisition based on the obtained system information.

An apparatus for wireless communication is described. The apparatus may include means for selecting, by a UE configured for cell acquisition for a first wireless protocol type using acquisition signals transmitted by deployments of the first wireless protocol type, to search for acquisition signals associated with a second wireless protocol type. In some cases, the apparatus may further include, means for receiving, from a base station, a first acquisition signal of a deployment of the second wireless device protocol type, wherein the deployment of the second wireless protocol type is frequency and time coupled with a deployment of the first wireless protocol type, means for performing a first portion of cell acquisition for a cell associated with the first wireless protocol type based at least in part on the first acquisition signal. Furthermore, in some cases, the apparatus may include, means for receiving a second signal associated with the cell of the deployments of the first wireless protocol type transmitted in resources determined based at least in part on the first portion of the cell acquisition, obtaining system information of the cell of the deployment of the first wireless protocol type based at least in part on the received second signal, and means for completing the cell acquisition based on the obtained system information.

A further apparatus for wireless communication is described. The apparatus may include a processor, memory in electronic communication with the processor, and instructions stored in the memory. The instructions may be operable to cause the processor to select, by a UE configured for cell acquisition for a first wireless protocol type using acquisition signals transmitted by deployments of the first wireless protocol type, to search for acquisition signals associated with a second wireless protocol type. In some cases, the instructions may be operable to cause the processor to further, receive, from a base station, a first acquisition signal of a deployment of the second wireless device protocol type, wherein the deployment of the second wireless protocol type is frequency and time coupled with a deployment of the first wireless protocol type, perform a first portion of cell acquisition for a cell associated with the first wireless protocol type based at least in part on the first acquisition signal. Furthermore, in some cases, the instructions may be operable to cause the processor to, receive a second signal associated with the cell of the deployments of the first wireless protocol type transmitted in resources determined based at least in part on the first portion of the cell acquisition, obtain system information of the cell of the deployment of the first wireless protocol type based at least in part on the received second signal, and complete the cell acquisition based on the obtained system information.

A non-transitory computer readable medium for wireless communication is described. The non-transitory computer-readable medium may include instructions operable to cause a processor to select, by a UE configured for cell acquisition for a first wireless protocol type using acquisition signals transmitted by deployments of the first wireless protocol type, to search for acquisition signals associated with a second wireless protocol type. In some cases, the instructions may be operable to cause the processor to further, receive, from a base station, a first acquisition signal of a deployment of the second wireless device protocol type, wherein the deployment of the second wireless protocol type is frequency and time coupled with a deployment of the first wireless protocol type, perform a first portion of cell acquisition for a cell associated with the first wireless protocol type based at least in part on the first acquisition signal. Furthermore, in some cases, the instructions may be operable to cause the processor to, receive a second signal associated with the cell of the deployments of the first wireless protocol type transmitted in resources determined based at least in part on the first portion of the cell acquisition, obtain system information of the cell of the deployment of the first wireless protocol type based at least in part on the received second signal, and complete the cell acquisition based on the obtained system information.

In some examples of the method, apparatus, or non-transitory computer-readable medium described above, the performing the portion of the cell acquisition comprises: determining at least one of a bandwidth, a system frame number, a physical cell identifier, a deployment type indicator, a type of band deployment for the first wireless protocol type, or a system value tag associated with the first wireless protocol type based on the first acquisition signal.

Some examples of the method, apparatus, or non-transitory computer-readable medium described above may further include processes, features, means, or instructions for determining resources for the receiving the first acquisition signal associated with the first wireless type deployment at least in part on resources of the cell that are not used for a system information signal associated with the second wireless device type deployment.

In some examples of the method, apparatus, or non-transitory computer-readable medium described above, the first wireless protocol type comprises one of an enhanced machine-type communications deployment or a narrowband internet of things deployment and the second wireless protocol type comprises the other of the enhanced machine-type communications deployment or the narrowband internet of things deployment.

In some examples of the method, apparatus, or non-transitory computer-readable medium described above, the first acquisition signal comprises at least one of a primary synchronization signal (PSS), a secondary synchronization signal (SSS), a physical broadcast channel (PBCH), a narrowband-PSS (NB-PSS), an NB-SSS, or an NB-PBCH.

In some examples of the method, apparatus, or non-transitory computer-readable medium described above, the performing the portion of the cell acquisition comprises obtaining radio frame timing of the cell from the first acquisition signal. In some examples of the method, apparatus, or non-transitory computer-readable medium described above, the completing the cell acquisition comprises combining multiple instances of at least one of a second acquisition signal or a physical broadcast channel associated with the second wireless device type deployment based on the obtained radio frame timing.

A method of wireless communication is described. The method may include transmitting, by a base station, a first acquisition signal associated with a deployment of a first wireless protocol type and a second acquisition signal associated with a deployment of a second wireless protocol type, wherein the deployment of the first wireless protocol type is within a carrier bandwidth of and frequency and time coupled with the deployment of the second wireless protocol type, and transmitting, by the base station, a second signal associated with the deployment of the first wireless protocol type, the second signal comprising information used for completing cell acquisition of the deployment of the first wireless protocol type.

An apparatus for wireless communication is described. The apparatus may include means for transmitting, by a base station, a first acquisition signal associated with a deployment of a first wireless protocol type and a second acquisition signal associated with a deployment of a second wireless protocol type, wherein the deployment of the first wireless protocol type is within a carrier bandwidth of and frequency and time coupled with the deployment of the second wireless protocol type, and means for transmitting, by the base station, a second signal associated with the deployment of the first wireless protocol type, the second signal comprising information used for completing cell acquisition of the deployment of the first wireless protocol type A further apparatus for wireless communication is described. The apparatus may include a processor, memory in electronic communication with the processor, and instructions stored in the memory. The instructions may be operable to cause the processor to transmit, by a base station, a first acquisition signal associated with a deployment of a first wireless protocol type and a second acquisition signal associated with a deployment of a second wireless protocol type, wherein the deployment of the first wireless protocol type is within a carrier bandwidth of and frequency and time coupled with the deployment of the second wireless protocol type, and transmit, by the base station, a second signal associated with the deployment of the first wireless protocol type, the second signal comprising information used for completing cell acquisition of the deployment of the first wireless protocol type A non-transitory computer readable medium for wireless communication is described. The non-transitory computer-readable medium may include instructions operable to cause a processor to transmit, by a base station, a first acquisition signal associated with a deployment of a first wireless protocol type and a second acquisition signal associated with a deployment of a second wireless protocol type, wherein the deployment of the first wireless protocol type is within a carrier bandwidth of and frequency and time coupled with the deployment of the second wireless protocol type, and transmit, by the base station, a second signal associated with the deployment of the first wireless protocol type, the second signal comprising information used for completing cell acquisition of the deployment of the first wireless protocol type Some examples of the method, apparatus, or non-transitory computer-readable medium described above may further include processes, features, means, or instructions for transmitting, by the base station in the second signal, system information associated with the first wireless protocol type, wherein the system information comprises at least one of physical broadcast channel position information, presence of the first wireless protocol type, bandwidth of the carrier, scheduling information, a deployment type, physical cell identifier, subframe validity information, frequency location information.

In some examples of the method, apparatus, or non-transitory computer-readable medium described above, the first acquisition signal has at least one characteristic modified from the second signal used for completing cell acquisition of the first wireless protocol type.

In some examples of the method, apparatus, or non-transitory computer-readable medium described above, the at least one characteristic comprises a cover code, a frequency raster position, a scrambling sequence, a sequence root, a sequence shift, a time position, or a payload size.

Some examples of the method, apparatus, or non-transitory computer-readable medium described above may further include processes, features, means, or instructions for transmitting the second signal, wherein transmitting the second signal comprises transmitting multiple second signals concurrently using multiple frequency resources.

In some examples of the method, apparatus, or non-transitory computer-readable medium described above, the indicated information comprises at least one of a bandwidth, a system frame number, a physical cell identifier, a deployment type indicator, a type of band deployment for the deployment of the first wireless protocol type, or a system value tag associated with the second wireless protocol type.

DETAILED DESCRIPTION

In the internet of everything (IoE), some devices may transmit a relatively low amount of data periodically (or when requested) rather than continuously exchanging information with a base station (or other serving station). Such devices may include meters (e.g., water meter, gas meter), sensors (e.g., smoke detector, light sensor), or wearable technology (e.g., smart watches), which may have limited battery life or may be located at the edges of cell coverage areas. Instead of operating using a deployment designed for high data rates or continuous communication (e.g., Long Term Evolution (LTE)/LTE-Advanced (LTE-A)), these devices may communicate using deployments designed to reduce the complexity of devices, increase coverage, and provide better battery life. Enhanced machine-type communications (eMTC) and narrow band internet of things (NB-IoT) deployments are examples of two such systems that may be supported by a base station and used by devices communicating at relatively low data rates or in low signal to noise ratio (SNR) environments.

While eMTC offers some advantages over NB-IoT (e.g., resource flexibility, channel quality feedback, and frequency diversity), cell acquisition may take two to three times longer in an eMTC deployment than in an NB-IoT deployment. As MTC devices may transmit data periodically (e.g. in an awake state), some MTC devices may remain in a "deep sleep" mode for relatively long periods of time and may only wake up to transmit data for a short period of time. Each time the MTC device wakes up, the MTC device may need to perform a cell acquisition procedure for synchronization to the base station and update of system information. If communicating in an eMTC deployment instead of an NB-IoT deployment, cell acquisition may take up to two to three times longer each time the device wakes up. As a result, battery life and overall communication performance may be adversely affected.

In some examples, a wireless device may perform cell acquisition for a cell associated with a first wireless protocol type (e.g., eMTC) using synchronization signals from a second, different wireless protocol type (e.g., NB-IoT). For example, a wireless device may obtain system information for the first wireless protocol type by decoding information in synchronization signals of the deployment of the second wireless protocol type. Using the obtained system information, a wireless device may reduce the cell acquisition time for the first wireless protocol type allowing for better performance and longer battery life.

Aspects of the disclosure are initially described in the context of a wireless communication system. Aspects are then described with reference to channel structures and process flows. Aspects of the disclosure are further illustrated by and described with reference to apparatus diagrams, system diagrams, and flowcharts that relate to eMTC cell acquisition using an NB synchronization channel.

Figure 1:
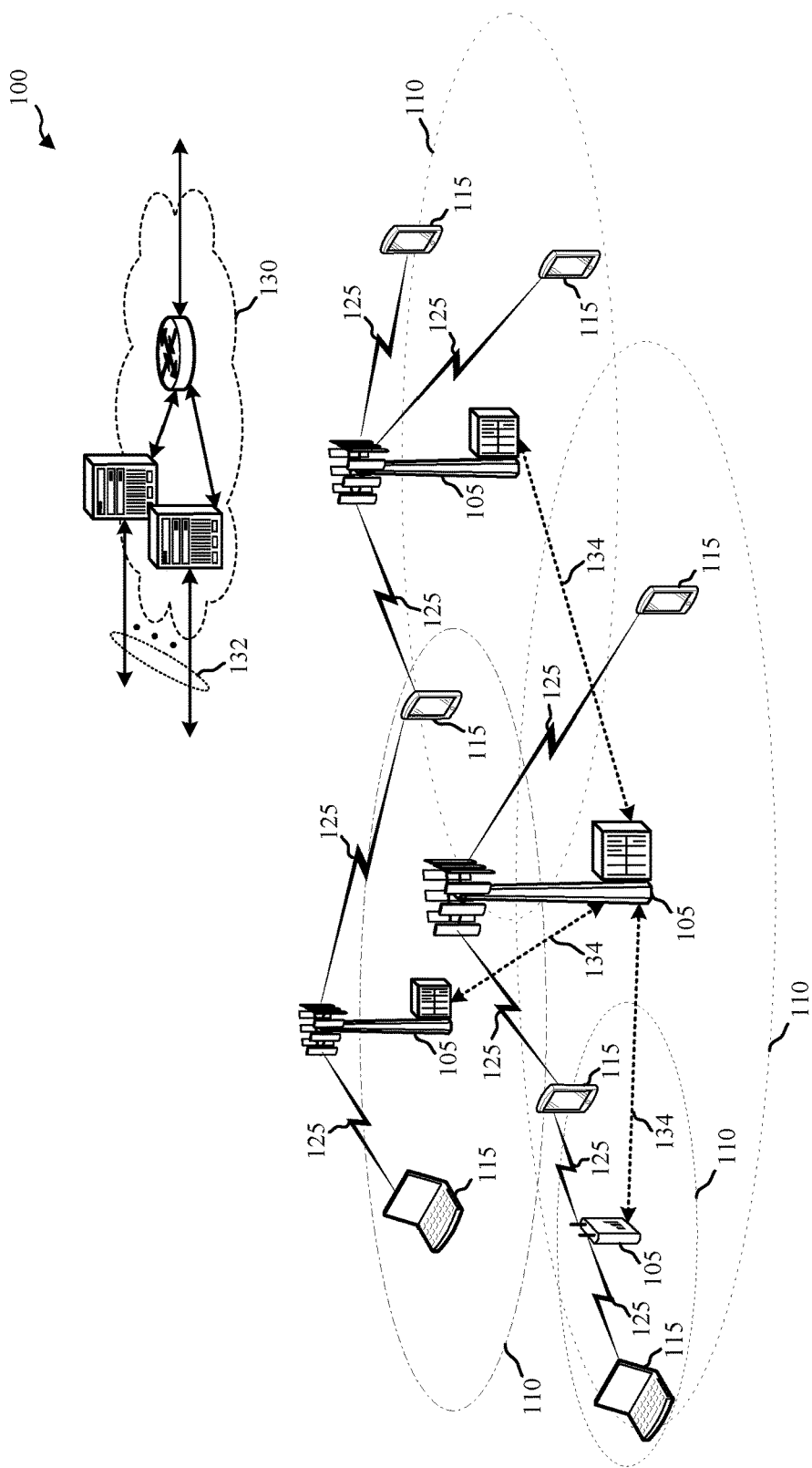
FIG. 1 illustrates an example of a wireless communications system that supports enhanced machine-type communications cell acquisition using a narrow band synchronization channel in accordance with aspects of the present disclosure.

FIG. 1 illustrates an example of a wireless communications system 100 in accordance with various aspects of the present disclosure. The wireless communications system 100 includes base stations 105, user equipment (UE) 115, and a core network 130. In some examples, the wireless communications system 100 may be a LTE/LTE-A network or a New Radio (NR) network. In some implementations, the wireless communications system 100 may employ multiple device type deployments, such as eMTC or NB-IoT, which may be used in low SNR environments.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may be a cellular phone, a wireless modem, a handheld device, a personal computer, a tablet, a personal electronic device, an MTC device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include CDMA systems, TDMA systems, FDMA systems, and OFDMA systems. A wireless multiple-access communications system may include a number of base stations, each simultaneously supporting communication for multiple communication devices (e.g., UEs).

Some types of wireless devices may provide for automated communication. Automated wireless devices may include those implementing Machine-to-Machine (M2M) communication or MTC. M2M or MTC may refer to data communication technologies that allow devices to communicate with one another or a base station without human intervention. For example, M2M or MTC may refer to communications from devices that integrate sensors or meters to measure or capture information and autonomously relay that information to a central server or application program that can make use of the information or present the information to humans interacting with the program or application. Some UEs 115 may be MTC devices, such as those designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. An MTC device may operate using half-duplex (one-way) communications at a reduced peak rate. MTC devices may also be configured to enter a power saving "deep sleep" mode when not engaging in active communications.

A base station 105 may support multiple device type deployments, such as eMTC or NB-IoT, among others. An eMTC deployment may provide resource flexibility and may use some channels associated with an LTE/LTE-A system, while an NB-IoT deployment may support a higher maximum coupling loss (MCL) and may include synchronization channels that support power boosting for faster cell acquisition and search.

Figure 2:
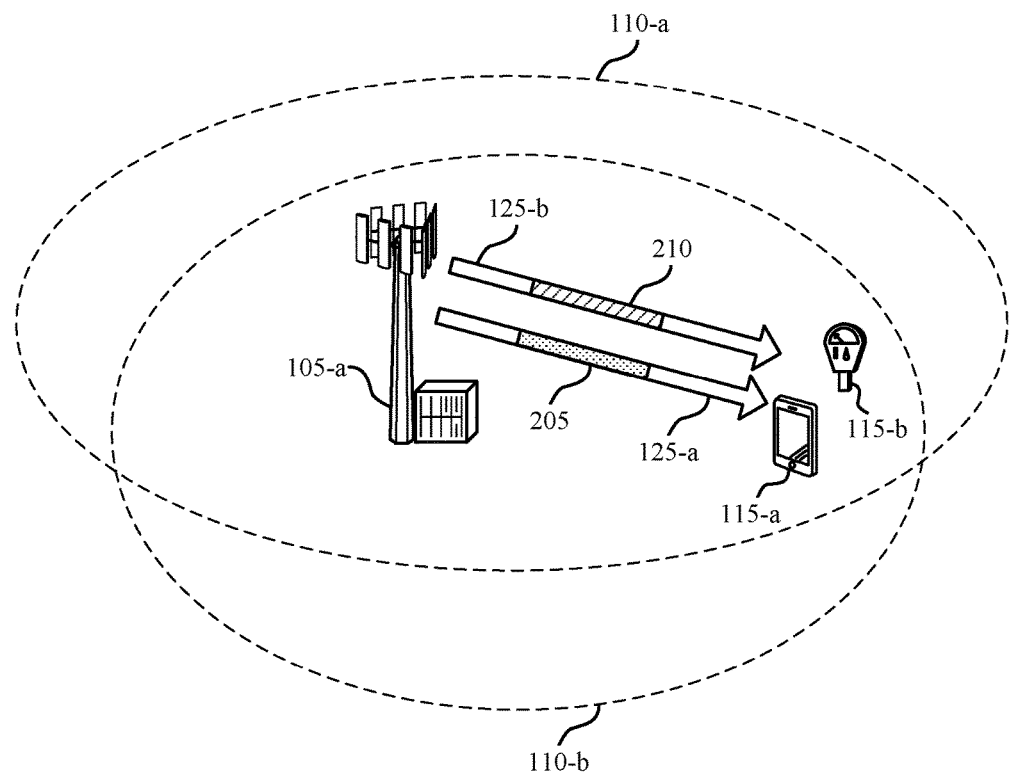
FIG. 2 illustrates an example of a wireless communications system that supports enhanced machine-type communications cell acquisition using a narrow band synchronization channel in accordance with aspects of the present disclosure.

FIG. 2 illustrates an example of a wireless communications system 200 for eMTC cell acquisition using an NB synchronization channel. In some cases, wireless communications system 200 may represent aspects of techniques performed by a UE 115 or base station 105 as described with reference to FIG. 1. In FIG. 2, base station 105-a supports an eMTC deployment associated with coverage area 110-a. In order to synchronize and communicate with UE 115-a, which may be or implement an MTC device, base station 105-a may transmit acquisition signals 205 associated with an eMTC deployment over communication link 125-a. The acquisition signals 205 may include one or more of a primary synchronization signal (PSS), a secondary synchronization signal (SSS), or a physical broadcast channel (PBCH). In some examples, the acquisition signals 205 are shared with a non-eMTC deployment (e.g., an LTE/LTE-A deployment). To perform cell acquisition, the UE 115-a may tune to different supported frequencies (i.e., channels) and search for one or more of the acquisition signals 205.

After receiving the acquisition signals 205, the UE 115-a may determine information related to radio frame timing and system information scheduling. For example, the UE 115-a may detect a PSS and determine system timing (e.g., frame boundaries, etc.). Once determined, the UE 115-a may then detect and decode an SSS, which may be transmitted in a symbol adjacent to the PSS. The UE 115-a may then obtain scheduling information for the PBCH. The UE 115-a then determines other information for cell acquisition by decoding the master information block (MIB) (e.g., system frame number (SFN), cell bandwidth, Physical Hybrid-ARQ Indicator Channel (PHICH) configuration, etc.), which may be used to located and decode system information blocks (SIBS) 1 and 2. After decoding or otherwise determining the system information for cell acquisition, the UE 115-a may connect to the cell served by the base station 105-a (e.g., by performing a random access procedure, etc.) and may operate according to the eMTC deployment.

As shown, base station 105-b also supports an NB-IoT deployment associated with a coverage area 110-b. Although shown as covering different areas, coverage areas 110-a and 110-b may cover the same area, overlap one another (as shown), or may be separate non-overlapping cover areas. In order to synchronize and communicate with UE 115-b, which may be an MTC device configured for communication via only the NB-IoT deployment, base station 105-a may transmit NB-IoT acquisition signals 210 over communication link 125-b. The acquisition signals 210 may include one or more of an NB-PSS, NB-SSS, or NB-PBCH. In some instances, the NB-IoT deployment may be in-band or otherwise associated with the eMTC deployment. For example, the NB-IoT deployment may be within a carrier bandwidth (e.g., in-band deployment, guardband deployment) of an LTE/LTE-A cell also used for eMTC, or may otherwise have frame timing that is synchronized to the LTE/LTE-A cell or eMTC deployment.

The UE 115-b may search for one or more NB-IoT acquisition signals 210. For example, the UE 115-a may tune to different raster frequencies. After receiving the NB-IoT acquisition signals 210, the UE 115-b may determine information related to radio frame timing and system information scheduling. For example, the UE 115-b may detect an NB-PSS and determine system timing information. Once determined, the UE 115-b may then detect and decode an NB-SSS, which may be transmitted in a symbol adjacent to the NB-PSS, to obtain scheduling information of the NB-PBCH. Using the NB-PBCH, the UE 115-b then determines other information such as the NB-MIB, NB-SIB1 and NB-SIB2. Using such information, the UE 115-b may be capable of acquiring and connecting to the base station 105-b using the NB-IoT deployment. In some instances, UE 115-a may be capable of communicating via communication link 125-a of the eMTC deployment, and communication link 125-b of the NB-IoT deployment.

As discussed above, UE 115-a may frequently enter a deep-sleep mode or may otherwise perform cell acquisition for the communication link 125-a of the eMTC deployment. Because cell acquisition using the acquisition signals 205 may take a substantial amount of time prior to any communication via communication link 125-a, the impact of cell acquisition on power consumption may be significant. According to various aspects described in detail below, UE 115-a may perform at least a portion of cell acquisition of the eMTC deployment using the NB-IoT acquisition signals 210. For example, UE 115-a may search for the NB-IoT acquisition signals 210 (e.g., by scanning raster frequencies within the carrier bandwidth associated with the eMTC deployment) to detect NB-IoT acquisition signals 210. After detecting NB-IoT acquisition signals 210, UE 115-a may decode one or more of the NB-PSS, NB-SSS or NB-PBCH to acquire partial system information including, for example, frame timing for the eMTC deployment. In some examples, information related to an eMTC deployment may be included in one or more signals associated with an NB-IoT deployment.

Figure 3A:
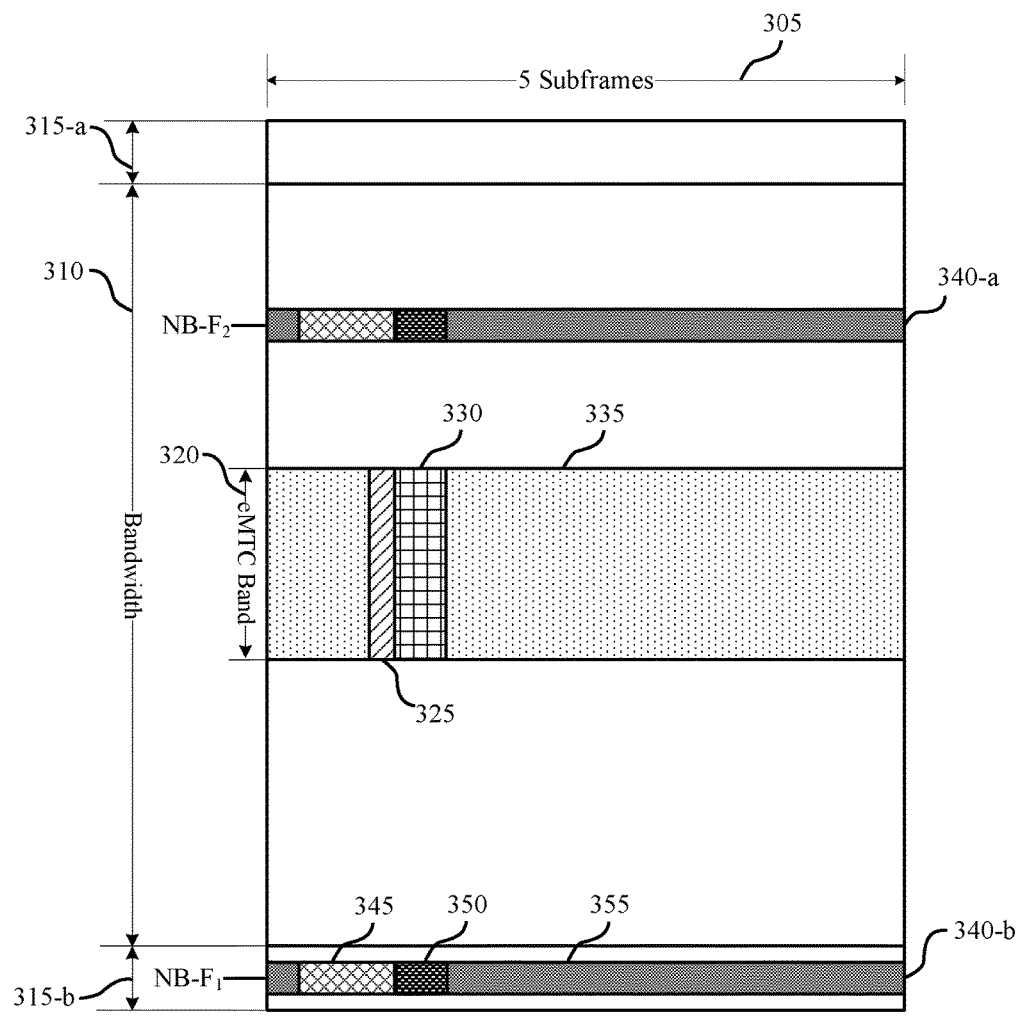
FIG. 3A illustrates an example of channel structure for enhanced machine-type communications cell acquisition using a narrow band synchronization channel in accordance with aspects of the present disclosure.

FIG. 3A illustrates an example of channel structure 300 for eMTC and NB-IoT deployments. In some cases, synchronization channels 300 may represent aspects of techniques performed by a UE 115 or base station 105 as described with reference to FIG. 1 or 2. As shown in FIG. 3A, a bandwidth 310 and subframes 305 may represent resources associated with or allocated for a wireless communications system (e.g., wireless communications systems 100 or 200 in FIG. 1 or 2). The bandwidth 310 for the carrier shown in channel structure 300 may be separated from a different carrier bandwidth (not shown) by guard bands 315-a and 315-b, which may be allocated to prevent interference between carriers in a wireless communications system. The guard bands 315-a and 315-b may be allocated for limited or no communication. For example, guard band 315-a does not contain any resources allocated for communication, while guard band 315-b has allocated some resources for NB communication (e.g., frequency resources NB-F$_1$ 340-b), as will be discussed below.

In FIG. 3A, at the center of bandwidth 310, resources are allocated for eMTC communication, as represented by eMTC band 320. The eMTC band 320 may span only a portion of bandwidth 310, as shown, or may span the entire bandwidth 310. In some examples, the eMTC band 320 may be located near either of the guard bands 315-a and 315-b, or may be located in different frequency regions at different times (e.g., frequency hopping). Though shown as contiguous, the eMTC band 320 may be non-contiguous and may span multiple frequency resources (e.g., resource blocks (RBs), etc.) across bandwidth 310. The eMTC band 320 may include resources allocated for acquisition signals, such as PSS/SSS 325. The PSS/SSS 325 may include information related to radio frame timing information (e.g., 10 millisecond (ms) boundaries of each radio frame). Further, using the PSS/SSS 325, a physical cell identity (PCID) may be obtained. The PSS may be transmitted by a base station 105 in the same resource block as the SSS, but may be transmitted in different symbols, for example. The PSS and SSS may also be periodically transmitted (e.g., every 5 or 10 subframes).

Also as shown, the eMTC band 320 includes resources allocated for a PBCH 330. The PBCH may include system information such as the MIB, which may be used to decode control channel transmissions to locate other system information (e.g., SIB1, and SIB2). In an eMTC deployment, SIB1 or SIB2 may be a bandwidth reduced (BR) SIB and may be represented as SIB1-BR or SIB2-BR. The system information may be used by a mobile device to perform cell acquisition for a cell supporting an eMTC deployment. The remaining resources in eMTC band 320 may be allocated for data, control, or other eMTC communications, as represented by resources 335.

Also as shown, frequency resources NB-F$_2$ 340-a of bandwidth 310 may be allocated for an NB-IoT deployment (e.g., in-band NB-IoT deployment). In addition, a portion of guard band 315-b, in particular NB-F$_1$ 340-b, may be allocated for an NB-IoT deployment (e.g., out-of-band NB-IoT deployment). In some examples, each of NB-F$_2$ 340-a and NB-F$_1$ 340-b span a single resource block, and NB-F$_2$ 340-a and NB-F$_1$ 340-b may be located contiguously or non-contiguously within the bandwidth 310. In some other cases, each of NB-F$_2$ 340-a and NB-F$_1$ 340-b may be located within guard bands 315-a or 315-b. Each of NB-F$_2$ 340-a and NB-F$_1$ 340-b include resources allocated for acquisition signals, such as NB-PSS/NB-SSS 345. The NB-PSS/NB-SSS 345 may include information related to radio frame timing information (e.g., 10 millisecond (ms) boundaries of each radio frame). Further, using the NB-PSS/NB-SSS 345, a PCID may be obtained. The NB-PSS may be transmitted by a base station 105 in the same resource block as the NB-SSS, but may be transmitted in different symbols, for example. The NB-PSS and NB-SSS may also be periodically transmitted (e.g., every 5 or 10 subframes). The NB-PSS/NB-SSS 345 may span more symbol periods than the PSS/SSS 325.

Each of NB-F$_2$ 340-*a* and NB-F$_1$ 340-*b* may also include resources allocated for a NB-PBCH 350. The NB-PBCH may include system information such as the NB-MIB, NB-SIB1, and NB-SIB2. The system information may include downlink system bandwidth or additional information related to the SFN. Such information may be used by a mobile device to perform cell acquisition for a cell supporting an NB-IoT deployment. The remaining resources in each of NB-F$_2$ 340-*a* and NB-F$_1$ 340-*b* may be allocated for data, control, or other NB-IoT communications, as represented by resources 355.

Figure 3B:
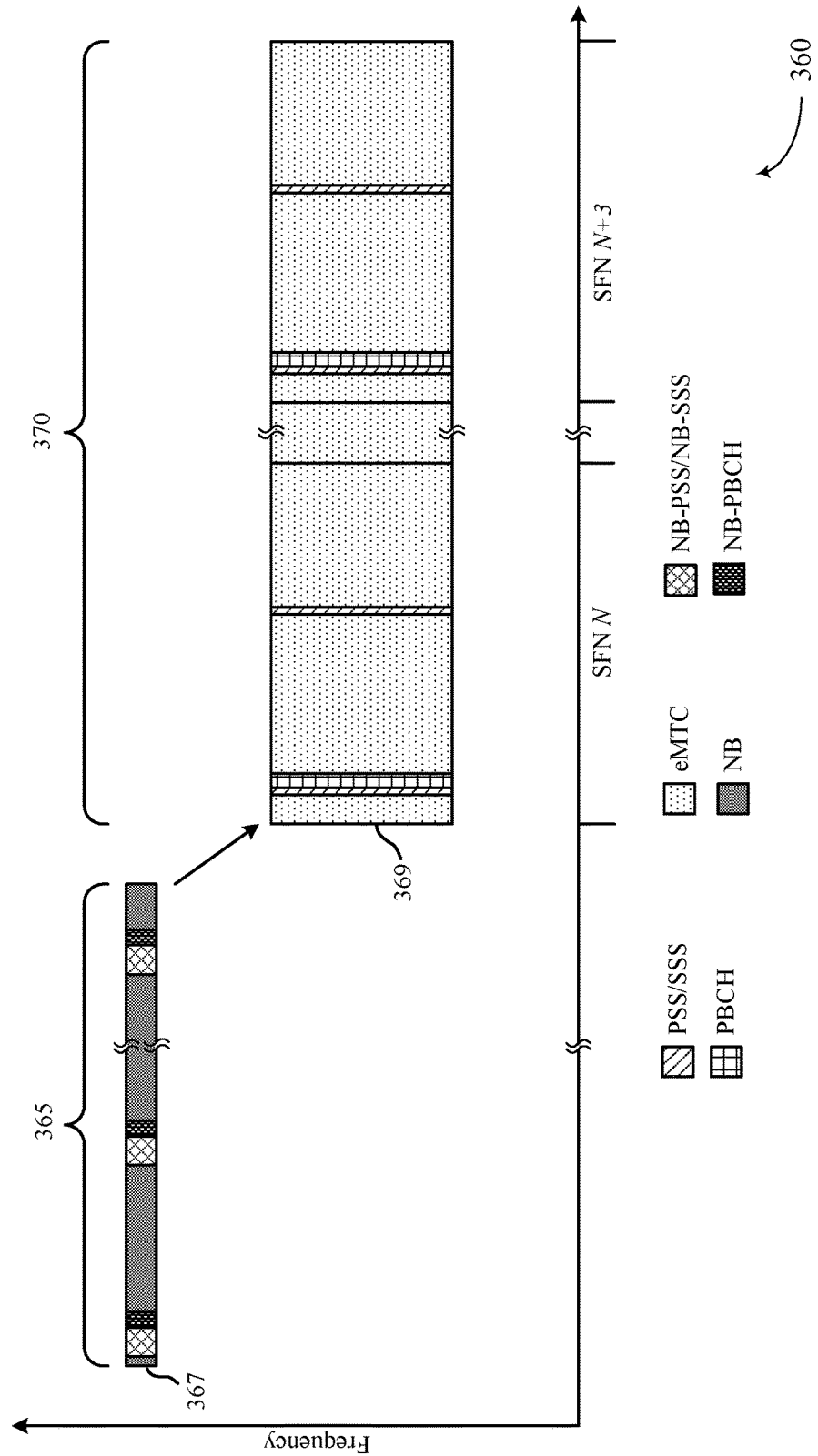
FIG. 3B illustrates an example of enhanced machine-type communications cell acquisition using a narrow band synchronization channel in accordance with aspects of the present disclosure.

FIG. 3B illustrates an example of cell acquisition 360 using eMTC and NB-IoT deployments. In some cases, cell acquisition 360 may represent aspects of techniques performed by a UE 115 as described with reference to FIG. 1 or 2. As shown in FIG. 3B, a first portion 365 of a cell acquisition by UE may include receiving one or more NB-IoT acquisition signals using resources 367 allocated for an NB-IoT deployment. Using information from the NB-IoT acquisition signals, the UE may determine radio frame timing and system information related to an eMTC deployment in order to perform a second portion 370 of a cell acquisition. For example, using the NB-IoT acquisition signals, the UE may determine radio frame timing or scheduling information of a PBCH associated with the eMTC deployment. Once information relating to the radio frame timing or PBCH scheduling for the eMTC deployment is obtained by the UE, the UE may perform a second portion 370 of cell acquisition using resources 369 allocated for eMTC deployment (e.g., using PSS/SSS/PBCH).

In some examples, the UE may use one or more of an NB-PSS, NB-SSS, or NB-PBCH for cell acquisition. For instance, the UE may obtain partial radio frame timing information from an NB-PSS. In some examples, an NB-PSS may be transmitted by a base station supporting an NB-IoT deployment and may be received by a UE. Using the NB-PSS, a UE may obtain radio frame boundaries (e.g., slot boundaries, 10 ms boundary, 1 ms boundary). After obtaining the radio frame boundaries, the UE may decode an SSS associated with an eMTC deployment by tuning from the NB deployment to receive signals associated with the eMTC deployment. For example, the UE may determine the resources allocated for the SSS and tune to the determined resources to obtain the SSS. After obtaining the SSS, the UE may decode the SSS to determine the resources allocated for a PBCH associated with the eMTC deployment. Thereafter, the UE may tune to the PBCH in order to obtain and decode the PBCH associated with the eMTC deployment to perform the second portion 370 of cell acquisition. In some examples, the PBCH may be determined using a 40 ms combining technique in which the UE obtains information transmitted in 4 consecutive frames (e.g., of 10 ms each) in order to determine the PBCH.

In some cases, a UE may obtain the information relating to the least significant bit (LSB) of the SFN and determine a boundary associated with 8 frames (e.g., of 10 ms each) from the NB-SSS. The UE may then tune to the PBCH (e.g., the center 6 RBs of resources 369) and decode the PBCH. Knowing the SFN LSB and/or the 8 frame boundary may assist in decoding the PBCH associated with eMTC. In some examples, the SFN determined from the NB-PBCH also may be the same as the eMTC SFN, and as a result, the UE may be able to combine received signals over a longer period to determine and decode the PBCH associated with the eMTC deployment.

Figure 4:
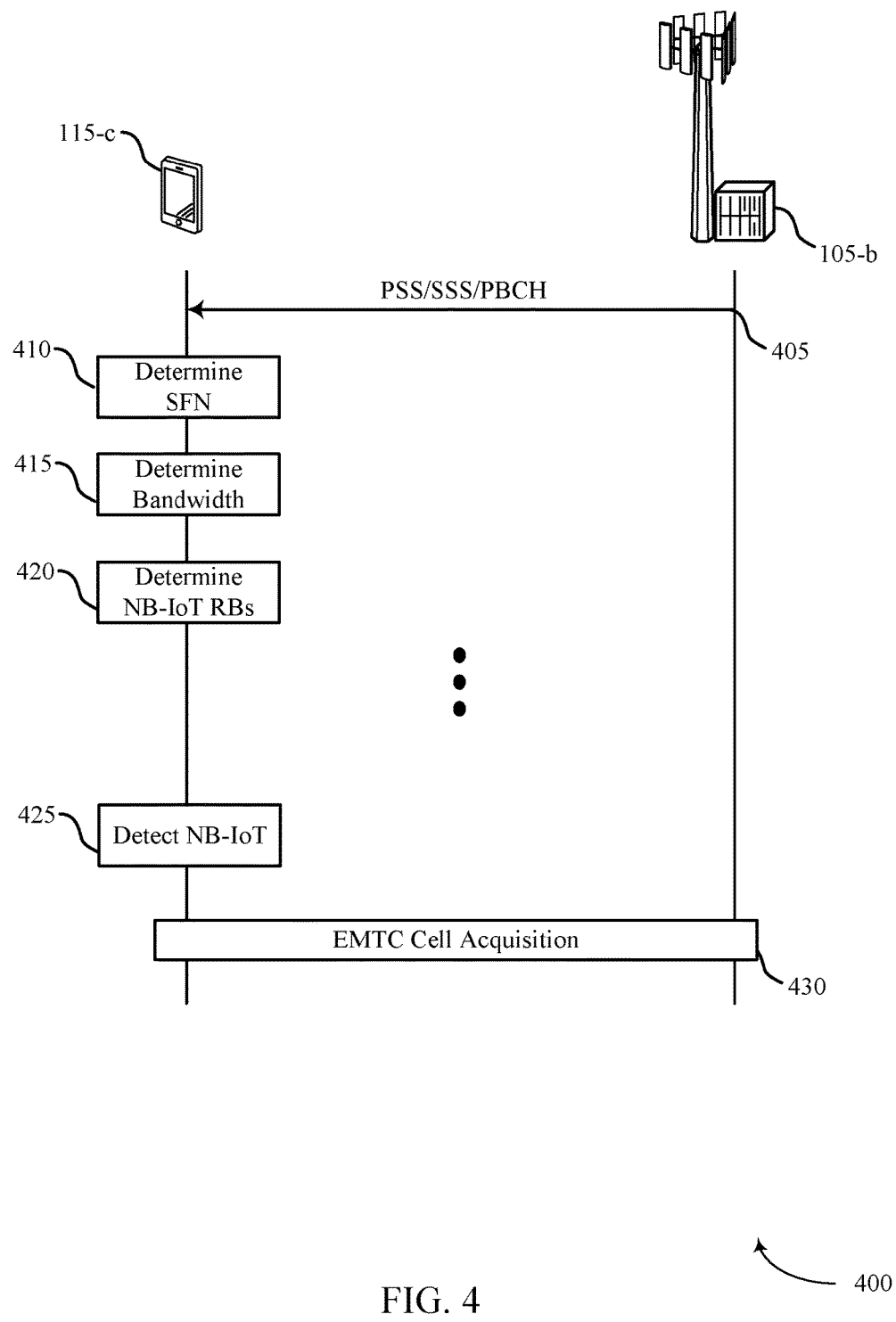
FIGS. 4 and 5 illustrate examples of process flow that support enhanced machine-type communications cell acquisition using a narrow band synchronization channel in accordance with aspects of the present disclosure.

FIG. 4 illustrates an example of a process flow 400 for eMTC cell acquisition using an NB synchronization channel. Process flow 400 may be used by a UE 115 to enhance eMTC cell acquisition in cases where, for example, UE 115 knows of an NB-IoT deployment that is frequency or time coupled with an eMTC deployment (e.g., in-band NB-IoT deployment, guardband NB-IoT deployment, etc.). In some cases, process flow 400 may represent aspects of techniques performed by a UE 115 or base station 105 as described with reference to FIG. 1 or 2. In FIG. 4, a base station 105-*b* may communicate with a UE 115-*c*. In some examples, the UE 115-*c* may be low data rate device, such as an MTC device, or another device operating in a low SNR environment.

At 405, the base station 105-*b* transmits acquisition signals associated with an eMTC deployment such as PSS/SSS/PBCH. After receiving one or more of the acquisition signals, the UE 115-*c* may determine radio frame timing including the SFN corresponding to eMTC communication with the base station 105-*b* at 410. For example, the UE 115-*c* may use either or both of the PSS and the SSS to determine frame timing.

At 415, the UE 115-*c* may determine the bandwidth allocated for communication with the base station 105-*b* (e.g., from the PBCH/MIB). After determining the bandwidth allocated for eMTC communication in 415, the UE 115-*c* determines resources allocated for NB-IoT deployment. For example, if NB-IoT is supported by the same cell as an eMTC deployment, the NB-IoT acquisition signals may be allocated in one or more RBs that do not interfere with or collide with system information (e.g., SIB1-BR) being transmitted by the base station 105-*b*. Using the determined SFN at 410 and bandwidth at 415, the UE 115-*c* may determine the resources on which the system information is being transmitted. Based on the resources allocated for the system information, the UE 115-*c* may determine the possible resources that may be allocated for NB-IoT channels. Such resources may then be searched to determine whether NB-IoT acquisition signals are being transmitted and if so, the UE 115-*c* may then use the NB-IoT acquisition signals for re-acquiring the cell after resuming from suspending reception. After a delay (due to deep sleep, for example), the UE 115-*c* may wake up and search the resources determined in 420 to detect one or more NB-IoT acquisition signals at 425. Using the NB-IoT acquisition signals, the UE 115-*c* may then determine synchronization timing to perform eMTC cell acquisition with the base station 105-*b* at 430.

Figure 5:
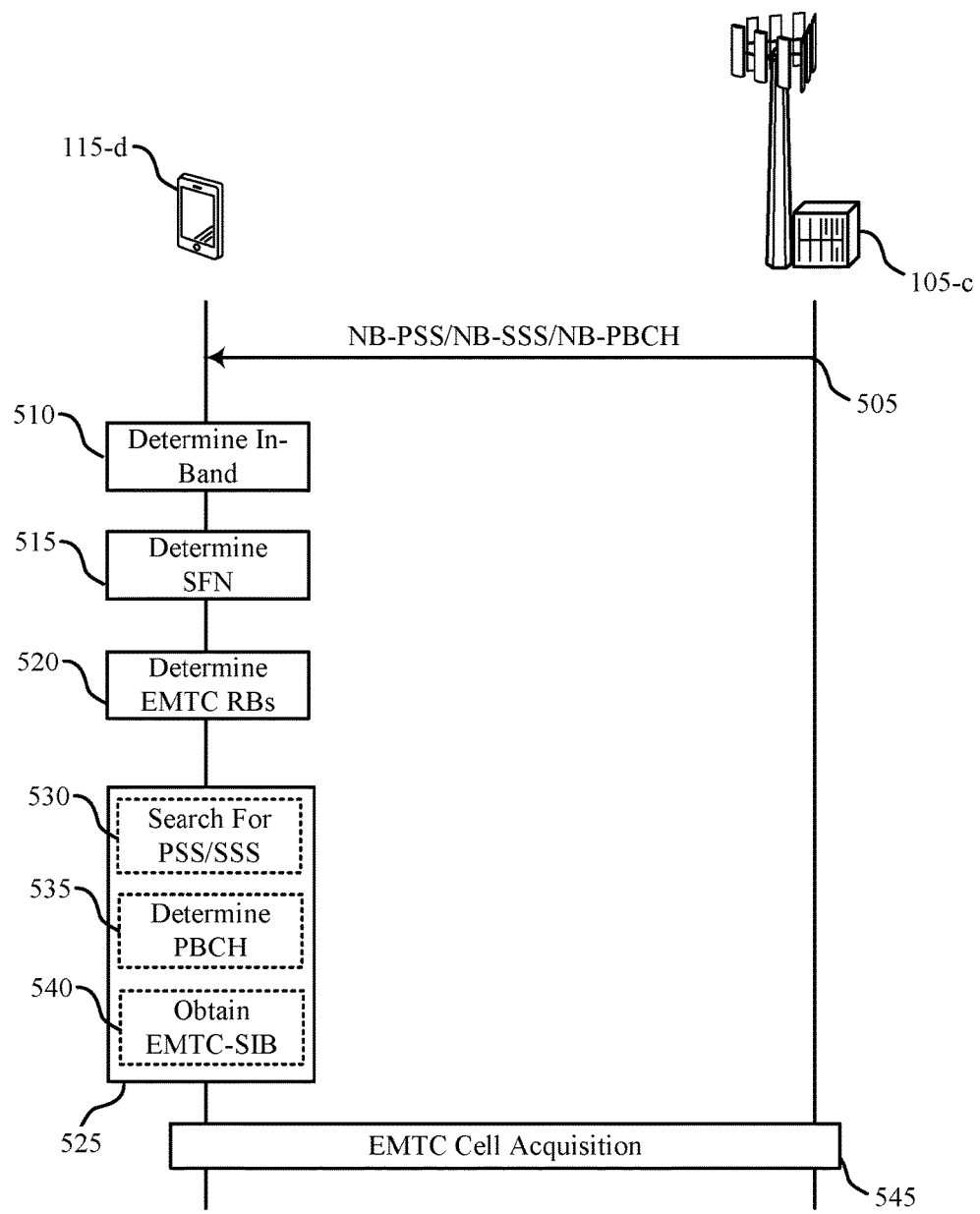

FIG. 5 illustrates an example of a process flow 500 for eMTC cell acquisition using a NB synchronization channel. Process flow 500 may provide for enhanced eMTC cell acquisition in instances where a UE 115 does not have a-priori knowledge of the eMTC cell (e.g., knowledge of the carrier frequency or timing associated with the eMTC deployment, etc.). In some cases, process flow 500 may represent aspects of techniques performed by a UE 115 or base station 105 as described with reference to FIG. 1 or 2. In FIG. 5, a base station 105-*c* may communicate with a UE 115-*d*. In some examples, the UE 115-*d* may be a low data rate device, such as an MTC device, or another device operating in a low SNR environment.

At 505, the base station 105-*c* transmits acquisition signals associated with an NB-IoT deployment such as NB-PSS/NB-SSS/NB-PBCH. After receiving one or more of the NB-IoT acquisition signals (e.g., by searching on a 100 kHz raster), the UE 115-*d* may determine whether the NB-IoT deployment is in band with an eMTC deployment at 510. For example, the UE 115-*d* may determine the bandwidth allocated for NB-IoT communication with the base station 105-*c* based on the NB-PBCH. Using one or more of the NB-PSS, NB-SSS, or NB-PBCH, the UE 115-*d* may determine radio frame timing including the SFN corresponding to NB-IoT communication with the base station 105-*c* at 515.

After determining the deployment type at 510, the UE 115-*d* determines resources allocated for an eMTC deployment at 520. For example, if NB-IoT is supported in the same cell as an eMTC deployment (e.g., in an in-band or guardband region of a carrier bandwidth including the eMTC deployment), the eMTC acquisition signals may be allocated resources in the center of the determined bandwidth (e.g., based on channel frequencies defined around the detected NB-IoT acquisition signals). In some cases, if it is determined that NB-IoT signals are in-band at 510, the UE 115-*d* may determine the center RBs (e.g., 6 RBs) of the determined bandwidth and in combination with the radio frame timing determined at 515, the UE 115-*d* may determine the RBs allocated for eMTC. If it is determined that the NB-IoT signals are not in-band at 510, the UE 115-*d* may determine all possible bandwidth locations for eMTC RBs. In some cases, the UE may obtain a raster offset from NB-PBCH and thereafter determine the possible eMTC frequency locations based on the obtained raster offset.

At 525, the UE 115-*d* may search the resources determined in 520 to determine information related to the eMTC deployment. For example, the UE 115-*d* may search the determined resources for eMTC acquisition signals, such as PSS/SSS in 530 and determine the cell ID and frame timing. If it is determined that NB-IoT signals are in-band at 510, the UE 115-*d* may determine that the PBCH is allocated resources in the center RBs of the determined bandwidth and in combination with the radio frame timing determined at 515, the UE 115-*c* may determine the PBCH in 535. After determining the PBCH, the UE 115-*d* may obtain system information related to the eMTC deployment at 540 by decoding the PBCH. Based on the obtained system information, the UE 115-*d* may perform eMTC cell acquisition at 545.

Figure 6:
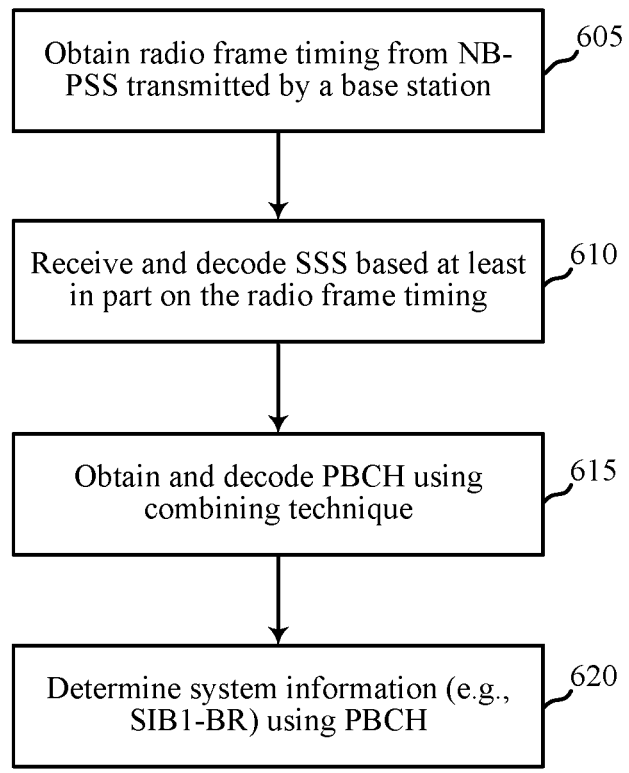
FIGS. 6 through 9 illustrate example methods that support enhanced machine-type communications cell acquisition using a narrow band synchronization channel in accordance with aspects of the present disclosure.

FIG. 6 illustrates an example of a method 600 for eMTC cell acquisition using a NB synchronization channel. In some cases, method 600 may represent aspects of techniques performed by a UE 115 or base station 105 as described with reference to FIG. 1 or 2. In this example, a UE may perform the method 600 to acquire an eMTC cell using information obtained from NB-IoT acquisition signals.

At 605, a UE may obtain radio frame timing from an NB-PSS. In some examples, an NB-PSS may be transmitted by a base station supporting an NB-IoT deployment and may be received or detected by a UE. For example, a UE may search for NB-PSS, or any other NB-IoT acquisition signal while performing a cell detection procedure. For instance, the UE may perform the search on a predefined channel raster (e.g., 100 kHz), and may subsequently obtain radio frame timing information using the NB-PSS.

At 610, the UE may decode an SSS associated with an eMTC deployment by tuning from the NB deployment to the eMTC deployment. For example, using the frame timing determined in 605, the UE may determine the resources allocated for the SSS and tune to the determined resources to obtain the SSS. In some cases, the SSS decoding in 610 may be performed based on the 10 ms radio frame boundary determined in 605. After obtaining the SSS, the UE may decode the SSS to determine resources allocated for a PBCH associated with the eMTC deployment.

At 615, the UE may obtain and decode PBCH associated with the eMTC deployment using a combining technique (e.g., 40 ms combining, 80 ms combining). In some cases, the UE may further utilize the resources allocated for PBCH and determined at 610 in obtaining and decoding the PBCH at 615. In a 40 ms combining technique, for example, the UE may obtain information transmitted in 4 consecutive frames (e.g. of 10 ms each) in order to determine the PBCH.

At 620, the UE may then determine system information such as SIB1-BR from the PBCH in order to perform eMTC cell acquisition. By utilizing NB-IoT acquisition signals, the UE may be able to perform eMTC cell acquisition faster.

Figure 7:
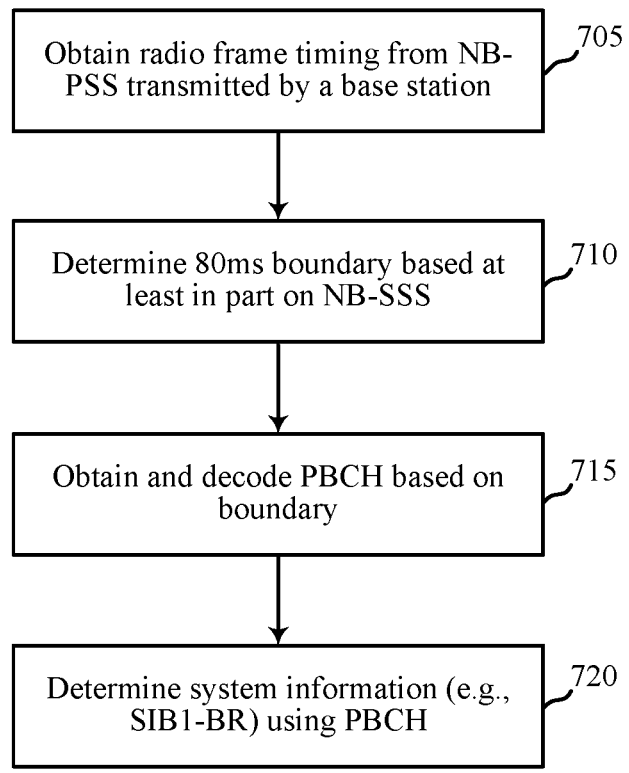

FIG. 7 illustrates an example of a method 700 for eMTC cell acquisition using a NB channel. In some cases, method 700 may represent aspects of techniques performed by a UE 115 or base station 105 as described with reference to FIG. 1 or 2. In this example, a UE may perform the method 700 to acquire an eMTC cell using information obtained from NB-IoT acquisition signals.

At 705, a UE may obtain radio frame timing from an NB-PSS. In some examples, an NB-PSS may be transmitted by a base station supporting an NB-IoT deployment and may be received or detected by a UE. For example, a UE may search for NB-PSS, or any other NB-IoT acquisition signal while performing a cell detection procedure. In some instances, the UE may perform the search on a predefined channel raster (e.g., 100 kHz). Using the NB-PSS, a UE may obtain the radio frame timing and/or information relating to the SFN (e.g., LSB of SFN).

At 710, the UE may determine a boundary associated with 8 frames (e.g., of 10 ms each) from the NB-SSS associated with the NB-IoT deployment. In some cases, the UE may also utilize the radio frame timing and information relating to the SFN to determine the boundary.

The UE may then tune to the PBCH (e.g., the center 6 RBs) and decode the PBCH at 715. In some cases, the UE may obtain and decode the PBCH based at least in part on the boundary obtained at 710.

Knowing the SFN LSB and/or the 8 frame boundary may assist in decoding the PBCH associated with the eMTC deployment (e.g., by combining over a longer time period). From the PBCH, the UE may then determine system information such as SIB1-BR at 720 in order to perform eMTC cell acquisition.

Figure 8:
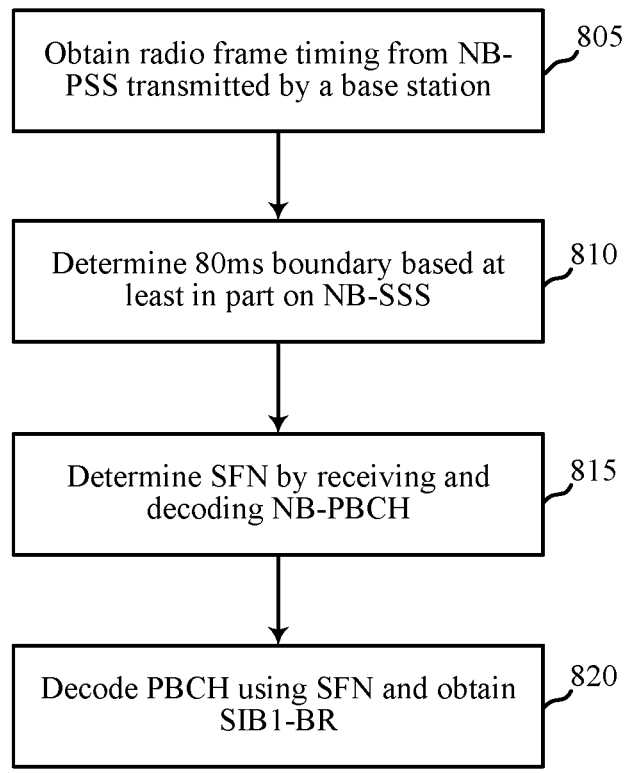

FIG. 8 illustrates an example of a method 800 for eMTC cell acquisition using a NB synchronization channel. In some cases, method 800 may represent aspects of techniques performed by a UE 115 or base station 105 as described with reference to FIG. 1 or 2. In this example, a UE may perform the method 800 to acquire an eMTC cell using information obtained from NB-IoT acquisition signals.

At 805, a UE may obtain radio frame timing from an NB-PSS. In some examples, an NB-PSS may be transmitted by a base station supporting an NB-IoT deployment and may be received or detected by a UE. For example, a UE may search for NB-PSS, or any other NB-IoT acquisition signal while performing a cell detection procedure. In some instances, the UE may perform the search on a predefined channel raster (e.g., 100 kHz). Using the NB-PSS, a UE may obtain the radio frame timing and/or information relating to the SFN (e.g., LSB(s) of SFN).

At 810, the UE may determine a boundary associated with 8 frames (e.g., at 10 ms each) from the NB-SSS associated with the NB-IoT deployment. The UE may then determine the SFN by decoding the NB-PBCH at 815. The UE may then decode the PBCH of the eMTC deployment at 820. Because the SFN determined from the NB-PBCH also may be the same as the eMTC SFN, the UE may be able to combine over a longer period to determine and decode the PBCH associated with the eMTC deployment at 820. Thus, the UE may be more quickly able to read the PBCH and obtain system information such as SIB1-BR in order to perform eMTC cell acquisition.

Figure 9:
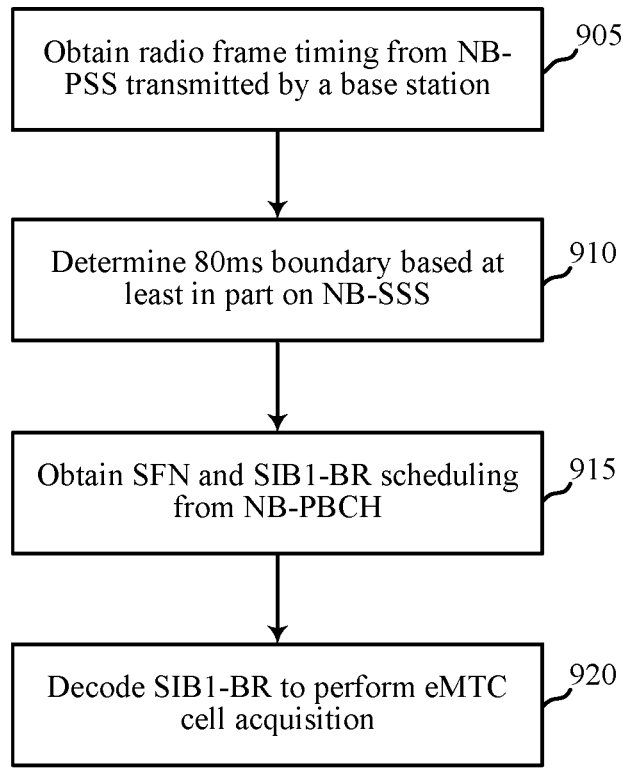

FIG. 9 illustrates an example of a method 900 for eMTC cell acquisition using a NB synchronization channel. In some cases, method 900 may represent aspects of techniques performed by a UE 115 or base station 105 as described with reference to FIG. 1 or 2. In this example, a UE may perform the method 900 to acquire an eMTC cell using information obtained from NB-IoT acquisition signals. In some examples, information related to an eMTC deployment may be included in one or more signals associated with an NB-IoT deployment. For example, system information in a SIB associated with NB-IoT may include information related to eMTC, such as eMTC presence, bandwidth of eMTC cell, SIB1-BR information, PBCH repetition, deployments supported, or the like. In some examples, information in the NB-MIB may include similar information as a MIB associated with eMTC, such as bandwidth information, SFN, or SIB1-BR scheduling information. With such information, a UE may not determine a MIB associated with eMTC. Rather, the UE may perform cell acquisition using system information associated with eMTC from the NB-MIB. Further, in some examples, a value tag may be included in an NB-MIB to indicate whether system information associated with an eMTC deployment has changed.

At 905, a UE may obtain radio frame timing from an NB-PSS. In some examples, an NB-PSS may be transmitted by a base station supporting an NB-IoT deployment and may be received by a UE. Using the NB-PSS, a UE may obtain the radio frame timing. At 910, the UE may determine a boundary associated with 8 frames (e.g., of 10 ms each) from the NB-SSS associated with the NB-IoT deployment. In some cases, the boundary may be based at least in part on the radio frame timing obtained at 905.

At 915, the UE may obtain the SFN and SIB1-BR scheduling information from the NB-PBCH. Thus, the UE may obtain complete frame timing information (SFN and LSBs), system bandwidth, presence of eMTC deployment, and/or SIB1-BR scheduling information for the eMTC deployment based on the NB acquisition signals and may proceed to tune to the eMTC deployment. Once the SIB1-BR scheduling information is obtained, at 920, the UE may decode the SIB1-BR to obtain system information used to perform eMTC cell acquisition.

In some examples, one or more NB-IoT acquisition signals may be modified for eMTC cell acquisition (e.g., transmitted for the purposes of eMTC cell acquisition and without an accompanying NB-IoT deployment). For example, an NB-IoT acquisition signal may be transmitted in a way that prevents true NB-IoT devices from recognizing the signal. Such modifications may include modification of a cover code, a frequency raster position (e.g., an offset from NB-IoT deployments, a different raster separation—e.g., 500 kHz instead of 100 kHz, or both), a scrambling sequence, a sequence root, a sequence shift, a time position, or a payload size of NB-PBCH. In some examples, a modified NB-IoT acquisition signal may not signal its deployment type as, for example, it may only be transmitted in-band for eMTC synchronization purposes. In some examples, a base station transmitting the NB-IoT acquisition signal for eMTC acquisition may also modify some other aspects of transmission, including transmitting only a subset of NB-PSS, NB-SSS and NB-PBCH, or transmitting an NB reference signal in a reduced set of subframes.

Figure 10:
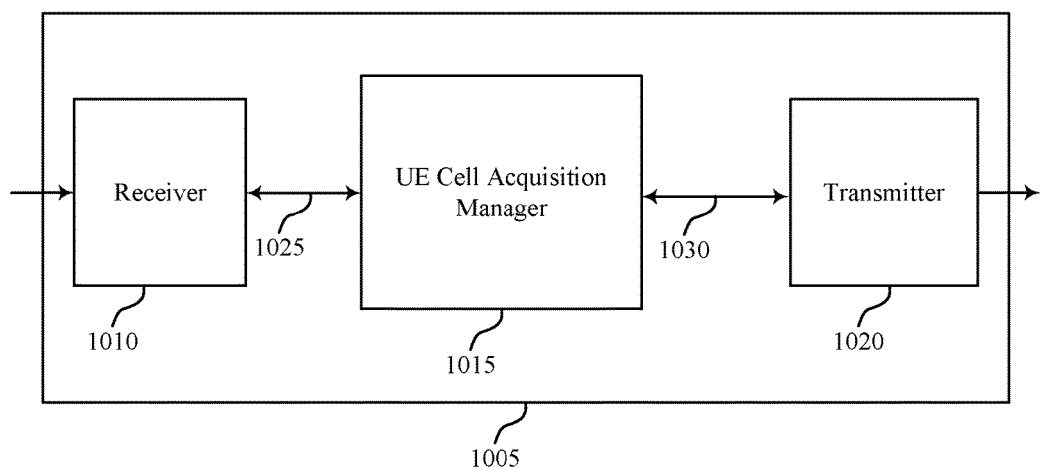
FIGS. 10 through 12 show block diagrams of a wireless device that supports enhanced machine-type communications cell acquisition using a narrow band synchronization channel in accordance with aspects of the present disclosure.

FIG. 10 shows a block diagram 1000 of a wireless device 1005 that supports eMTC cell acquisition using an NB synchronization channel in accordance with various aspects of the present disclosure. Wireless device 1005 may be an example of aspects of a UE 115 as described with reference to FIGS. 1 and 2. Wireless device 1005 may include receiver 1010, UE cell acquisition manager 1015, and transmitter 1020. Wireless device 1005 may also include a processor. Each of these components may be in communication with one another (e.g., via one or more buses).

The receiver 1010 may receive information such as packets, user data, or control information associated with various information channels (e.g., control channels, data channels, and information related to eMTC cell acquisition using NB synchronization channel, etc.). Information 1025 may be passed on to other components of the device, for example, via a link or one or more buses. The receiver 1010 may be an example of aspects of the transceiver 1340 described with reference to FIG. 13.

The UE cell acquisition manager 1015 may be an example of aspects of the UE cell acquisition manager 1315 described with reference to FIG. 13. The UE cell acquisition manager 1015 may select to search for acquisition signals associated with a second wireless protocol type in order to complete cell acquisition for a first wireless protocol type. The UE cell acquisition manager 1015 may receive, from a base station, a first acquisition signal associated with a second wireless protocol type, where the first and second wireless protocol types may be frequency and time coupled. In some cases, the UE cell acquisition manager 1015 may perform a first portion of cell acquisition for a cell of the deployment of the first wireless protocol type based at least in part on the first acquisition signal. In some cases, the UE cell acquisition manager 1015 may pass on signals 1030 pertaining to the first portion or second portion of the cell acquisition to transmitter 1020 for transmission.

Furthermore, the UE cell acquisition manager 1015 may receive a second signal associated with the cell of the deployment of the first wireless protocol type, where the second signal may be transmitted by the base station in resources determined based at least in part on the first portion of the cell acquisition. The UE cell acquisition manager 1015 may also obtain system information of the cell of the deployment of the first wireless protocol type based at least in part on the received second signal, prior to completion of cell acquisition.

As described above, in some cases, the UE cell acquisition manager 1015 may further pass on information or signals 1030 to the transmitter 1020 for transmission. For example, the transmitter 1020 may transmit one or more signals 1030 generated by other components of the device. In some examples, the transmitter 1020 may be collocated with a receiver 1010 in a transceiver module. For example, the transmitter 1020 may be an example of aspects of the transceiver 1340 described with reference to FIG. 13. The transmitter 1020 may include a single antenna, or it may include a set of antennas.

Figure 11:
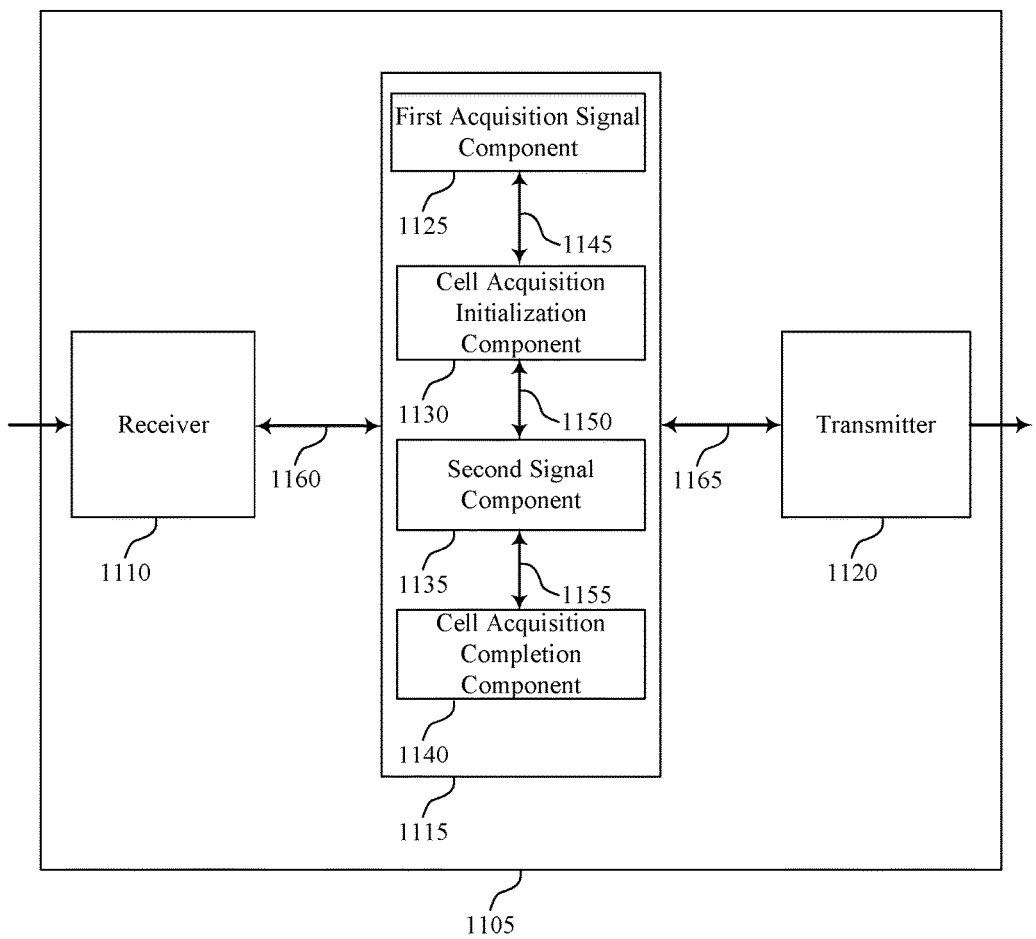

FIG. 11 shows a block diagram 1100 of a wireless device 1105 that supports eMTC cell acquisition using an NB acquisition channel in accordance with various aspects of the present disclosure. Wireless device 1105 may be an example of aspects of a wireless device 1005 or a UE 115 as described with reference to FIGS. 1, 2, and 10. Wireless device 1105 may include receiver 1110, UE cell acquisition manager 1115, and transmitter 1120. Wireless device 1105 may also include a processor. Each of these components may be in communication with one another (e.g., via one or more buses).

The receiver 1110 may receive information such as packets, user data, or control information associated with various information channels (e.g., control channels, data channels, and information related to eMTC cell acquisition using an NB synchronization channel, etc.). Information 1160 may be passed on to other components of the device via a link, or one or more buses. The receiver 1110 may be an example of aspects of the transceiver 1340 described with reference to FIG. 13.

The UE cell acquisition manager 1115 may be an example of aspects of the UE cell acquisition manager 1315 described with reference to FIG. 13. The UE cell acquisition manager 1115 may also include first acquisition signal component 1125, cell acquisition initialization component 1130, second signal component 1135, and cell acquisition completion component 1140.

The first acquisition signal component 1125 may receive, from a base station, a first acquisition signal associated with a deployment of a second wireless protocol type, where the deployment of the second wireless protocol type is frequency and time coupled with a deployment of a wireless protocol type. In some cases, the first wireless protocol type deployment includes one of an eMTC deployment or an NB-IoT deployment, and the second wireless protocol type deployment includes the other of the eMTC deployment or the NB-IoT deployment. In some cases, the first acquisition signal includes at least one of a PSS, an SSS, a PBCH, an NB-PSS, an NB-SSS, or an NB-PBCH.

The cell acquisition initialization component 1130 may perform a first portion of cell acquisition for a cell associated with the first wireless protocol type based at least in part on the received first acquisition signal 1145. In some cases, the performing the first portion of the cell acquisition includes obtaining radio frame timing of the cell from the first acquisition signal.

Using information 1150 pertaining to the first portion of cell acquisition (e.g., radio frame timing), the second signal component 1135 may receive a second signal associated with the first wireless protocol type deployment, and transmitted in resources determined based at least in part on the first portion of the cell acquisition. The second signal may be included in information 1155 passed on to cell acquisition completion component 1140.

The cell acquisition completion component 1140 may obtain system information of the cell of the deployment of the first wireless protocol type based at least in part on the received second signal 1155. In some cases, the cell acquisition completion component 1140 may complete cell acquisition based on the obtained system information.

The transmitter 1120 may transmit signals 1165 generated by other components of the device. For example, the transmitter 1120 may receive one or more signals 1165 (e.g., eMTC of NB-IoT signals) from the UE cell acquisition manager 1115 for transmission. In some examples, the transmitter 1120 may be collocated with a receiver 1110 in a transceiver module. For example, the transmitter 1120 may be an example of aspects of the transceiver 1340 described with reference to FIG. 13. The transmitter 1120 may include a single antenna, or it may include a set of antennas.

Figure 12:
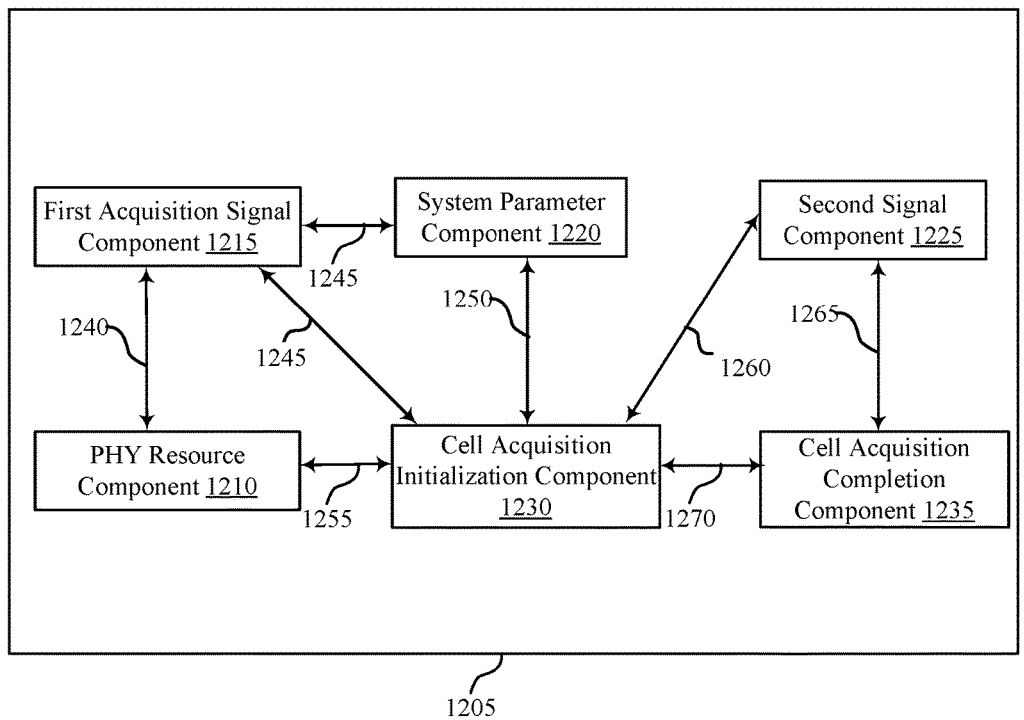

FIG. 12 shows a block diagram 1200 of a UE cell acquisition manager 1205 that supports eMTC cell acquisition using an NB synchronization channel in accordance with various aspects of the present disclosure. The UE cell acquisition manager 1205 may be an example of aspects of a UE cell acquisition manager 1015, a UE cell acquisition manager 1115, or a UE cell acquisition manager 1315 described with reference to FIGS. 10, 11, and 13. The UE cell acquisition manager 1205 may include a PHY resource component 1210, first acquisition signal component 1215, a system parameter component 1220, a second signal component 1225, cell acquisition initialization component 1230, and a cell acquisition completion component 1235. Each of these modules may communicate, directly or indirectly, with one another (e.g., via one or more buses).

The first acquisition signal component 1215 may receive, from a base station, a first acquisition signal 1245 associated with a second wireless protocol type. In some cases, the first wireless protocol type deployment includes one of an eMTC deployment or an NB-IoT deployment and the second wireless device type deployment includes the other of the eMTC deployment or the NB-IoT deployment. In some cases, the first acquisition signal 1245 includes at least one of a PSS, an SSS, a PBCH, an NB-PSS, an NB-SSS, or an NB-PBCH. In some cases, the first acquisition signal component 1215 may pass on or relay the first acquisition signal 1245 to the cell acquisition initialization component 1230, or system parameter component 1220, or both.

The cell acquisition initialization component 1230 may perform a first portion of cell acquisition for a cell associated with the first wireless protocol type deployment based on the received first acquisition signal 1245. In some cases, the performing the first portion of the cell acquisition includes obtaining radio frame timing of the cell from the first acquisition signal. In some cases, the cell acquisition initialization component 1230 may pass on the radio frame timing, the first acquisition signal 1245, or a combination thereof to the cell acquisition completion component 1235 via link 1270.

The second signal component 1225 may receive a second signal 1265 associated with the second wireless protocol type deployment, wherein the second signal 1265 may be transmitted in resources determined based on the first portion of the cell acquisition. In some cases, the second signal component 1225 may pass on the second signal 1265 or information pertaining to it to the cell acquisition completion component 1235. Furthermore, in some cases, the second signal component 1225 may be in communication with the cell acquisition initialization component 1230 via link 1260, enabling it to pass on information pertaining to the second signal 1265.

The cell acquisition completion component 1235 may complete the cell acquisition based on the second signal 1265 and information obtained from the cell acquisition initialization component 1230 via link 1270. In some cases, the completing the cell acquisition includes obtaining radio frame timing from the first acquisition signal 1245, system information of the cell of the deployment of the first wireless protocol type, or a combination thereof. Furthermore, in some cases, completing the cell acquisition may also include combining multiple instances of at least one of the second signal 1265 or a PBCH associated with the second wireless protocol type based on the obtained radio frame timing.

The system parameter component 1220 may determine system parameters 1250 for performing the first portion of the cell acquisition. In some cases, the performing the first portion of the cell acquisition includes: determining at least one of a bandwidth, a system frame number, a physical cell identifier, a deployment type indicator, a type of band deployment for the deployment of the first wireless protocol type, or a system value tag associated with the second wireless device type deployment based on the first acquisition signal 1245 received from the first acquisition signal component 1215. In some cases, the system parameter component 1220 may pass on the system parameters 1250 to the cell acquisition initialization component 1230, enabling it to perform the first portion of the cell acquisition.

The PHY resource component 1210 may determine resources 1240 for receiving the first acquisition signal associated with the second wireless protocol type deployment, based at least in part on resources of the cell that are not used for a system information signal associated with the first wireless protocol type. In some cases, the PHY resource component may pass on information pertaining to the determined resources 1240 to the first acquisition signal component. Furthermore, in some cases, the PHY resource component 1210 may be in communication with the cell acquisition initialization component 1230 via link 1255.

Figure 13:
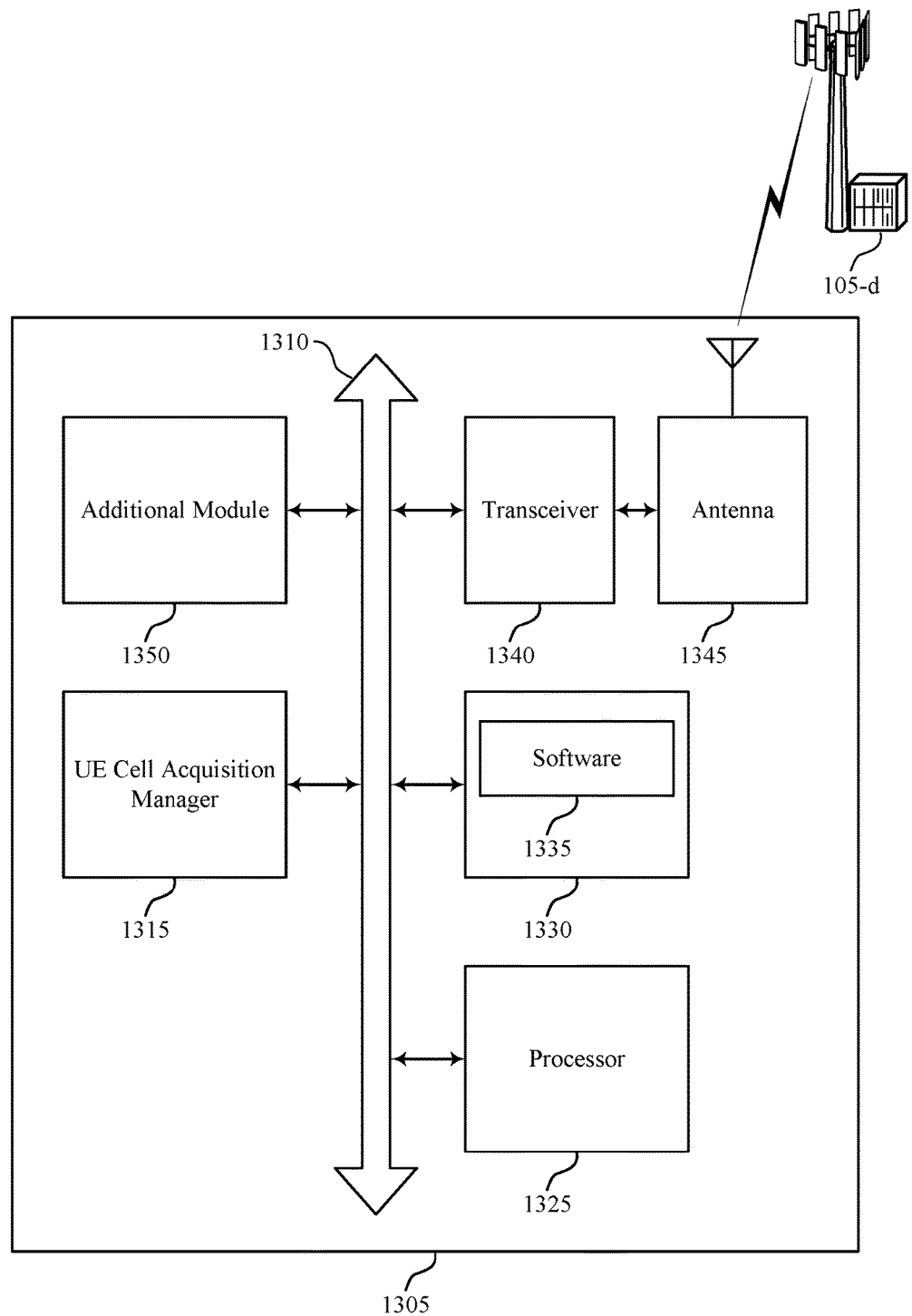
FIG. 13 illustrates a block diagram of a system including a UE that supports enhanced machine-type communications cell acquisition using a narrow band synchronization channel in accordance with aspects of the present disclosure.

FIG. 13 shows a diagram of a system 1300 including a wireless device 1305 that supports eMTC cell acquisition using an NB acquisition channel in accordance with various aspects of the present disclosure. Wireless device 1305 may be an example of a wireless device 1005, wireless device 1105, or a UE 115 as described above, e.g., with reference to FIGS. 1, 2, 10 and 11.

Wireless device 1305 may include components for bi-directional voice and data communications including components for transmitting and receiving communications, including UE cell acquisition manager 1315, processor 1325, memory 1330, software 1335, transceiver 1340, antenna 1345, and additional module 1350. Furthermore, each of these modules may communicate, directly or indirectly, with one another via bus 1310. The bus 1310 may be an example of aspects of bus 1710 as described with reference to FIG. 17.

The UE cell acquisition manager 1315 may be an example of aspects of UE cell acquisition managers 1015, 1115, or 1205 described with reference to FIGS. 10, 11, and 12. The processor 1325 may include an intelligent hardware device, (e.g., a central processing unit (CPU), a microcontroller, an application specific integrated circuit (ASIC), etc.)

The memory 1330 may include random access memory (RAM) and read only memory (ROM). The memory 1330 may store computer-readable, computer-executable software 35 including instructions that, when executed, cause the processor to perform various functions described herein (e.g., eMTC cell acquisition using an NB acquisition channel, etc.).

In some cases, the software 1335 may not be directly executable by the processor but may cause a computer (e.g., when compiled and executed) to perform functions described herein.

The transceiver 1340 may communicate bi-directionally, via one or more antennas, wired, or wireless links as described above. For example, the transceiver 1340 may communicate bi-directionally with another wireless device. The transceiver 1340 may also include a modem to modulate the packets and provide the modulated packets to the antennas for transmission, and to demodulate packets received from the antennas.

In some cases, the wireless device may include a single antenna 1345. However, in some cases the device may have more than one antenna 1345, which may be capable of concurrently transmitting or receiving multiple wireless transmissions.

Figure 14:
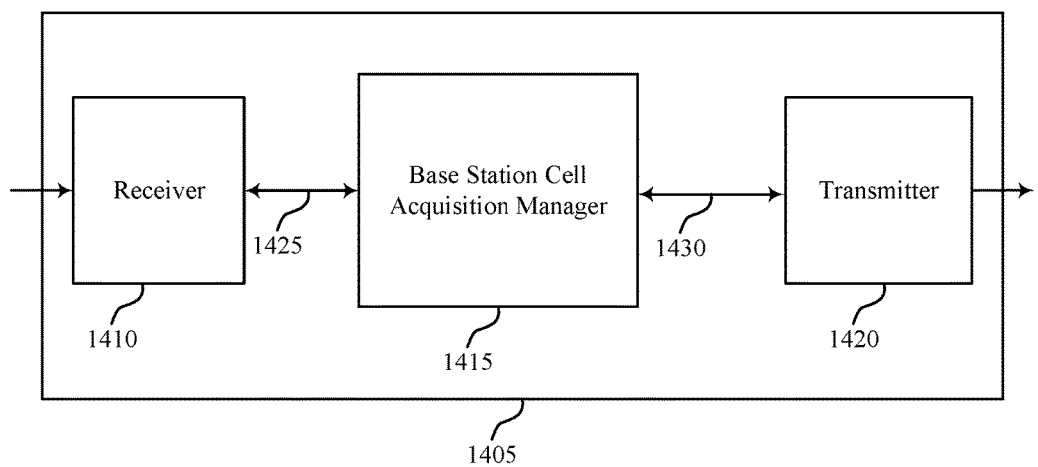
FIGS. 14 through 16 show block diagrams of a wireless device that supports enhanced machine-type communications cell acquisition using a narrow band synchronization channel in accordance with aspects of the present disclosure.

FIG. 14 shows a block diagram 1400 of a wireless device 1405 that supports eMTC cell acquisition using an NB acquisition channel in accordance with various aspects of the present disclosure. Wireless device 1405 may be an example of aspects of a base station 105 as described with reference to FIGS. 1 and 2. Wireless device 1405 may include receiver 1410, base station cell acquisition manager 1415, and transmitter 1420. Wireless device 1405 may also include a processor. Each of these components may be in communication with one another (e.g., via one or more buses).

The receiver 1410 may receive information such as packets, user data, or control information associated with various information channels (e.g., control channels, data channels, and information related to eMTC cell acquisition using an NB synchronization channel, etc.). Information 1425 may be passed on to other components of the device. The receiver 1410 may be an example of aspects of the transceiver 1740 described with reference to FIG. 17.

The base station cell acquisition manager 1415 may be an example of aspects of the base station cell acquisition manager 1715 described with reference to FIG. 17. The base station cell acquisition manager 1415 may enable the base station to transmit, over a carrier, a first acquisition signal associated with a deployment of a first wireless protocol type, and a second acquisition signal associated with a deployment of a second wireless protocol type. In some cases, the deployment of the first wireless protocol type is within a carrier bandwidth of and frequency and time coupled with the deployment of the second wireless protocol type. In some examples, the base station cell acquisition manager 1415 may also transmit, by the base station over the carrier, a second signal associated with the deployment of the first wireless protocol type, the second signal comprising information used for completing cell acquisition of the deployment of the first wireless protocol type.

The transmitter 1420 may transmit signals 1430 generated by other components of the device. In some examples, the transmitter 1420 may be collocated with a receiver 1410 in a transceiver module. For example, the transmitter 1420 may be an example of aspects of the transceiver 1740 described with reference to FIG. 17. The transmitter 1420 may include a single antenna, or it may include a set of antennas.

Figure 15:
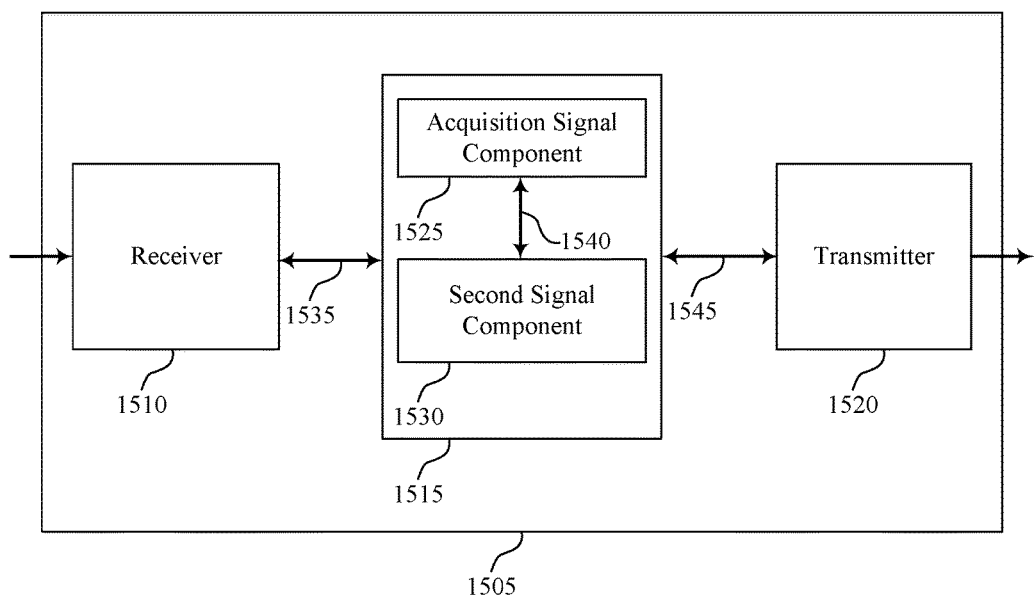

FIG. 15 shows a block diagram 1500 of a wireless device 1505 that supports eMTC cell acquisition using an NB acquisition channel in accordance with various aspects of the present disclosure. Wireless device 1505 may be an example of aspects of a wireless device 1405 or a base station 105 as described with reference to FIGS. 1, 2 and 14. Wireless device 1505 may include receiver 1510, base station cell acquisition manager 1515, and transmitter 1520. Wireless device 1505 may also include a processor. Each of these components may be in communication with one another (e.g., via one or more buses).

The receiver 1510 may receive information such as packets, user data, or control information associated with various information channels (e.g., control channels, data channels, and information related to eMTC cell acquisition using an NB synchronization channel, etc.). Information 1535 may be passed on to other components of the device. The receiver 1510 may be an example of aspects of the transceiver 1740 described with reference to FIG. 17.

The base station cell acquisition manager 1515 may be an example of aspects of the base station cell acquisition manager 1715 described with reference to FIG. 17. The base station cell acquisition manager 1515 may also include acquisition signal component 1525 and second signal component 1530. In some cases, the acquisition signal component 1525 and the second signal component 1530 may be in communication with each other via link 1540.

The acquisition signal component 1525 may transmit, by a base station over a carrier, a first acquisition signal associated with a first wireless protocol type, and a second acquisition signal associated with a deployment of a second wireless protocol type. In some cases, the deployment of the first wireless protocol type may be within a carrier bandwidth of an frequency and time coupled with the deployment of the second wireless protocol type, as further described with reference to FIG. 3A. Link 1540 may be used to exchange information related to cell acquisition (e.g., information related to an eMTC deployment which may be included in one or more signals associated with an NB-IoT deployment).

The second signal component 1530 may transmit, by the base station over the carrier, a second signal associated with the deployment of the first wireless protocol type, where the second signal includes information used for completing cell acquisition of the deployment of the first wireless protocol type. In some cases, transmitting the second signal may include transmitting multiple instances of the second signal, concurrently, using multiple frequency resources. Furthermore, in some cases, the system information embedded in the second signal(s) may include one or more of a PBCH position information, presence of the first wireless protocol type, bandwidth of the carrier, scheduling information, a deployment or protocol type, physical cell identifier, subframe validity information, or frequency location information.

The transmitter 1520 may transmit signals 1545 generated by other components of the device. In some examples, the transmitter 1520 may be collocated with a receiver 1510 in a transceiver module. For example, the transmitter 1520 may be an example of aspects of the transceiver 1740 described with reference to FIG. 17. The transmitter 1520 may include a single antenna, or it may include a set of antennas.

Figure 16:
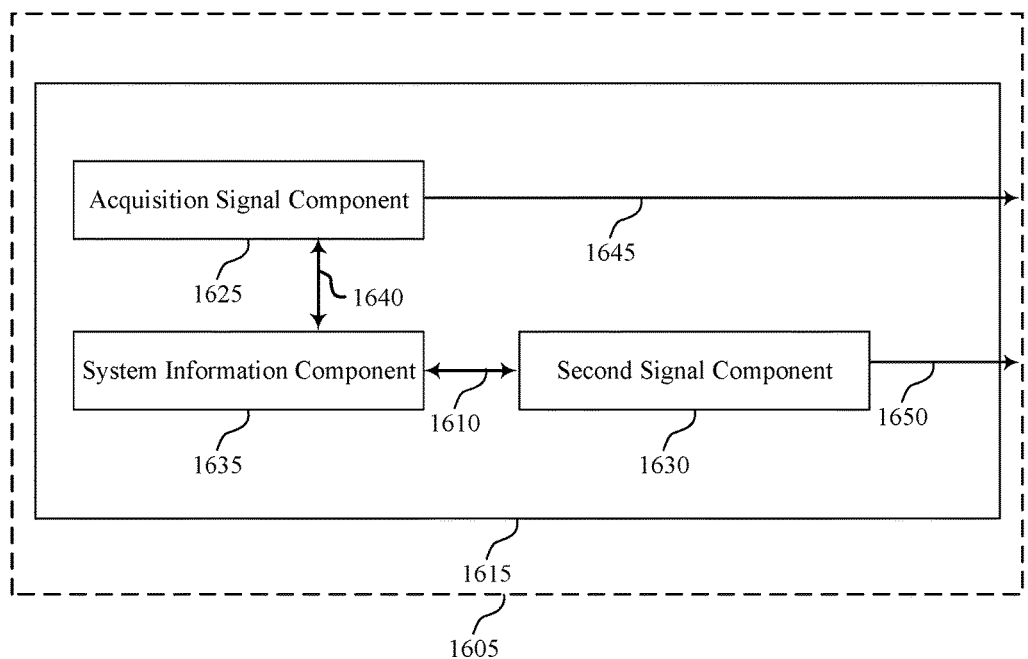

FIG. 16 shows a block diagram 1600 of a base station cell acquisition manager 1615 (located in a wireless device 1605) that supports eMTC cell acquisition using an NB acquisition channel in accordance with various aspects of the present disclosure. In some cases, the wireless device 1605 may be an example of aspects of a wireless device 1405, wireless device 1505, or a base station 105 as described with reference to FIGS. 1, 2, 14, and 15. The base station cell acquisition manager 1615 may be an example of aspects of a base station cell acquisition manager 1415, a base station cell acquisition manager 1515, or a base station cell acquisition manager 1715 described with reference to FIGS. 14, 15, and 17. The base station cell acquisition manager 1615 may include acquisition signal component 1625 and second signal component 1630. Each of these modules may communicate, directly or indirectly, with one another (e.g., via one or more buses).

The acquisition signal component 1625 may generate a first acquisition signal associated with a deployment of a first wireless protocol type, and a second acquisition signal associated with a deployment of a second wireless protocol type. In some cases, the acquisition signal component 1625 may pass on the first and second acquisition signals 1645 to a transmitter (not shown) for transmission over a carrier. In some examples, the deployment of the first wireless protocol type is within a carrier bandwidth of and frequency and time coupled with the deployment of the second wireless protocol type. In some cases, the first wireless protocol type may be one of an eMTC or narrowband IoT, and the second wireless protocol type may be the other of eMTC or narrowband IoT. In some cases, the acquisition signal component 1625 may be in communication with the system information component 1635 via link 1640 and may pass on system information 1610 pertaining to the first wireless protocol type deployment to the acquisition signal component 1625.

The second signal component 1630 may generate a second signal 1650 associated with the deployment of the first wireless protocol type, where the second signal 1650 includes system information 1610 associated with the first wireless protocol type, and which may allow a UE to complete cell acquisition with the deployment of the first protocol type. The second signal component 1630 may pass on the second signal 1650 to a transmitter (not shown) for transmission over a carrier. In some cases, the second signal component 1630 may be in communication with the system information component 1635, allowing it to receive system information 1610 associated with the deployment of the first wireless protocol type, as further described below.

In some cases, the system information component 1635 may transmit, by the base station in the second signal, system information 1610 associated with the first wireless protocol type deployment, where the system information 1610 includes at least one of physical broadcast channel position information, presence of the first wireless protocol type deployment, bandwidth of the carrier, scheduling information, a protocol or deployment type, physical cell identifier, subframe validity information, or frequency location information. In some cases, the system information component 1635 may pass on the system information 1610 to the second signal component 1630.

In some cases, transmitting the second signal 1650 includes transmitting multiple instances of the second signal 1650, concurrently, using multiple frequency resources. In some cases, the second signal 1650 has at least one characteristic modified from the first acquisition signal of the first wireless protocol type. In some cases, the at least one characteristic includes a cover code, a frequency raster position, a scrambling sequence, a sequence root, a sequence shift, a time position, or a payload size. In some cases, the indicated information includes at least one of a bandwidth, a system frame number, a physical cell identifier, a deployment type indicator, a type of band deployment for the first wireless protocol type, or a system value tag associated with the second wireless protocol type.

Figure 17:
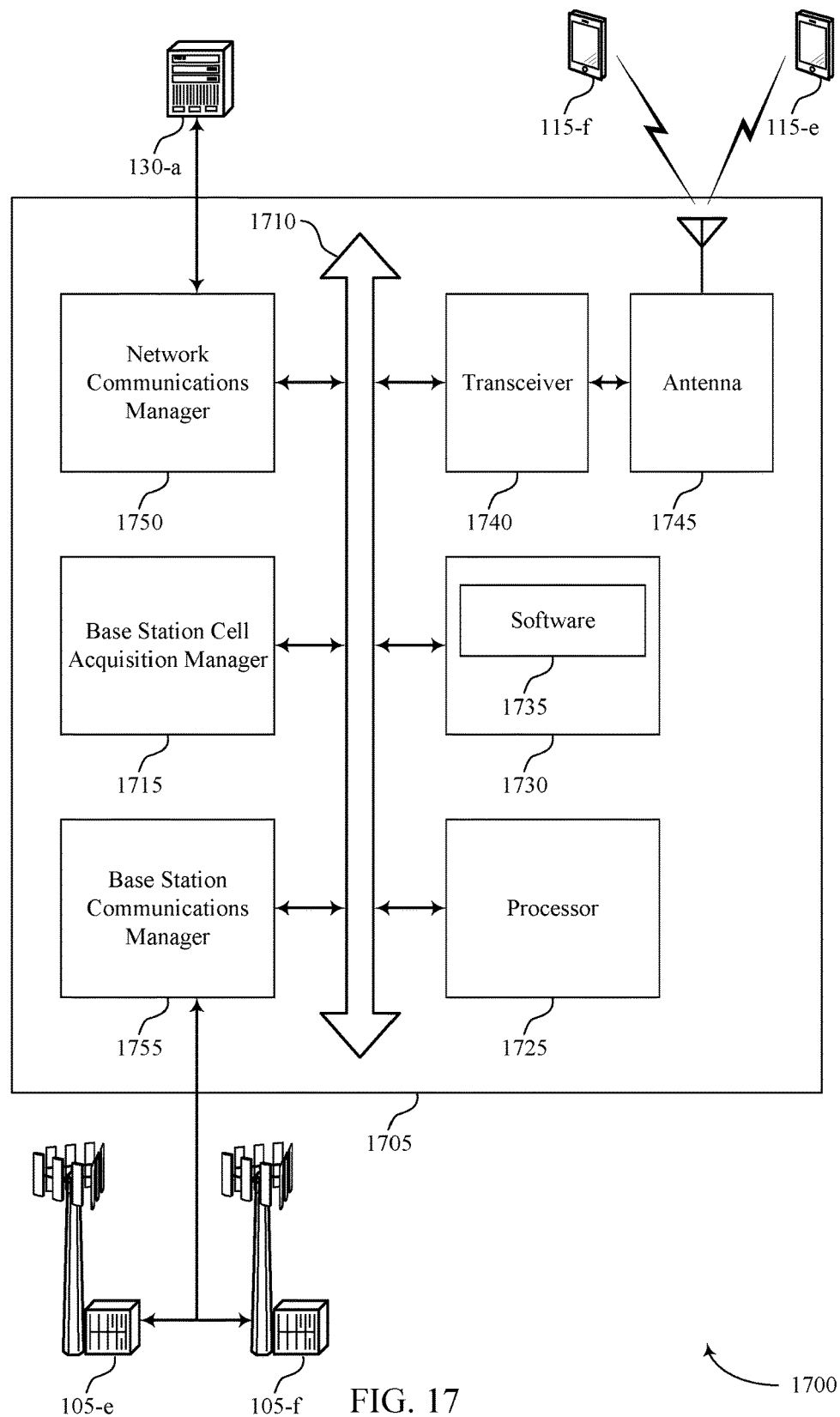
FIG. 17 illustrates a block diagram of a system including a base station that supports enhanced machine-type communications cell acquisition using a narrow band synchronization channel in accordance with aspects of the present disclosure.

FIG. 17 shows a diagram of a system 1700 including a wireless device 1705 that supports eMTC cell acquisition using an NB acquisition channel in accordance with various aspects of the present disclosure. Wireless device 1705 may be an example of a wireless device 1405, wireless device 1505, or a base station 105 as described above, e.g., with reference to FIGS. 1, 2, 14 and 15.

Wireless device 1705 may include components for bi-directional voice and data communications including components for transmitting and receiving communications, including base station cell acquisition manager 1715, processor 1725, memory 1730, software 1735, transceiver 1740, antenna 1745, network communications manager 1750, and base station communications manager 1755 for communicating with base stations 105-*e* and 105-*f*. Furthermore, each of these modules may communicate, directly or indirectly, with one another via bus 1710.

The base station cell acquisition manager 1715 may be an example of aspects of the base station cell acquisition managers 1415, 1515, and 1615 as described with reference to FIGS. 14, 15, and 16. The processor 1725 may include an intelligent hardware device, (e.g., a central processing unit (CPU), a microcontroller, an application specific integrated circuit (ASIC), etc.)

The memory 1730 may include random access memory (RAM) and read only memory (ROM). The memory 1730 may store computer-readable, computer-executable software 35 including instructions that, when executed, cause the processor to perform various functions described herein (e.g., migration of a local gateway function, etc.).

In some cases, the software 1735 may not be directly executable by the processor but may cause a computer (e.g., when compiled and executed) to perform functions described herein.

The transceiver 1740 may communicate bi-directionally, via one or more antennas, wired, or wireless links as described above. For example, the transceiver 1740 may communicate bi-directionally with another wireless device such as UEs 115-e and 115-f. The transceiver 1740 may also include a modem to modulate the packets and provide the modulated packets to the antennas for transmission, and to demodulate packets received from the antennas.

In some cases, the wireless device may include a single antenna 1745. However, in some cases the device may have more than one antenna 1745, which may be capable of concurrently transmitting or receiving multiple wireless transmissions.

Figure 18:
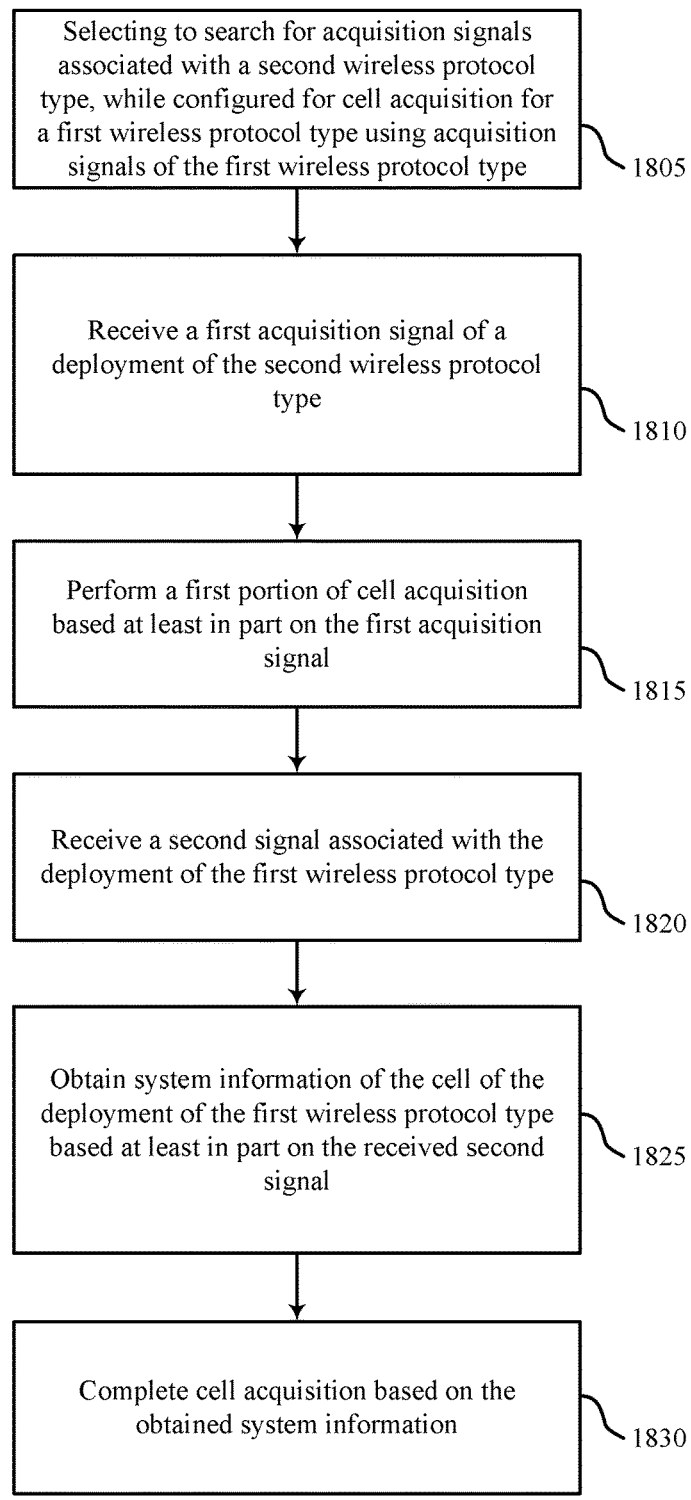
FIGS. 18 through 19 show flowcharts illustrating example methods for enhanced machine-type communications cell acquisition using a narrow band synchronization channel in accordance with aspects of the present disclosure.

FIG. 18 shows a flowchart illustrating a method 1800 for eMTC cell acquisition using an NB synchronization channel in accordance with various aspects of the present disclosure. The operations of method 1800 may be implemented by a device such as a UE 115 or its components as described with reference to FIGS. 1 and 2. For example, the operations of method 1800 may be performed by the UE cell acquisition manager as described herein. In some examples, the UE 115 may execute a set of codes to control the functional elements of the device to perform the functions described below. Additionally or alternatively, the UE 115 may perform aspects of the functions described below using special-purpose hardware.

Method 1800 may begin when a UE 115 is attempting or wishing to communicate using eMTC. In some instances, NB-IoT and eMTC may be deployed in the same cell and the UE 115 operating within the coverage area of the cell may support both eMTC and NB-IoT. In such cases, to reduce cell acquisition time, the UE 115 may utilize NB-IoT acquisition signals for synchronization or to obtain system information for operating in eMTC. At block 1805, the UE 115 may select to search for acquisition signals associated with a second wireless protocol type (e.g., NB-IoT or eMTC), while configured for cell acquisition of a first wireless protocol type (e.g., eMTC or NB-IoT) using acquisition signals of the first wireless protocol type. In certain examples, the operations of block 1805 may be performed by the UE cell acquisition manager as described with reference to FIGS. 10 and 11.

At block 1810, the UE 115 may receive a first acquisition signal of a deployment of the second wireless protocol type. In some cases, the first acquisition signal may comprise at least one of a PSS, a SSS, a PBCH, a NB-PSS, a NB-SSS, or an NB-PBCH. In certain examples, the operations of block 1810 may be performed by the UE cell acquisition manager as described with reference to FIGS. 10 and 11.

At block 1815, the UE 115 may utilize the received first acquisition signal to perform a first portion of cell acquisition of the deployment of the first wireless protocol type. In some cases, performing the first portion of the cell acquisition may comprise obtaining radio frame timing of the cell. In certain examples, the operations of block 1815 may be performed by the cell acquisition initialization component as described with reference to FIG. 11.

At block 1820, the UE 115 may receive a second signal associated with the deployment of the first wireless protocol type. In some cases, the second signal may contain system information associated with the first wireless protocol type. In certain examples, the operations of block 1820 may be performed by the second signal component as described with reference to FIG. 11.

At block 1825, the UE 115 may obtain system information of the cell of the deployment of the first wireless protocol type, based at least in part on the received second signal. In some cases, the system information may comprise at least one of a PBCH position information, presence of the first wireless protocol type, bandwidth of the carrier, scheduling information, physical cell identifier, subframe validity information, etc. In certain examples, the operations of block 1825 may be performed by the UE cell acquisition manager as described with reference to FIGS. 10 and 11.

At block 1830, the UE 115 may complete the cell acquisition based at least in part on the obtained system information. In some cases, the completing the cell acquisition may comprise combining multiple instances of at least one of the first acquisition signal or a PBCH associated with the second wireless protocol type based on the obtained radio frame timing. In certain examples, the operations of block 1830 may be performed by the cell acquisition completion component as described with reference to FIG. 11.

Figure 19:
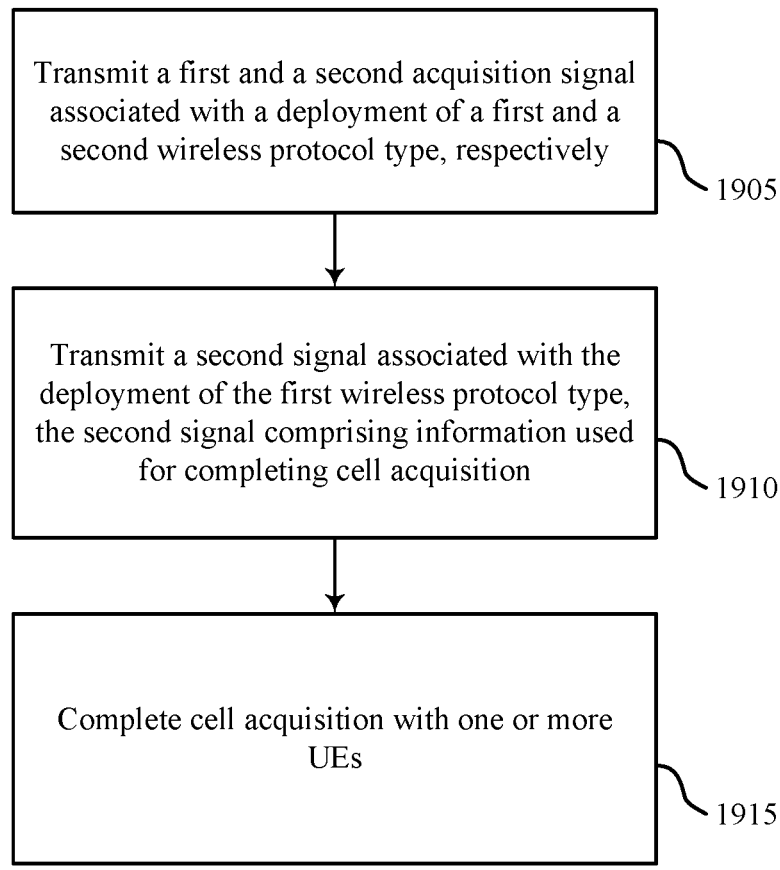

FIG. 19 shows a flowchart illustrating a method 1900 for eMTC cell acquisition using an NB synchronization channel in accordance with various aspects of the present disclosure. The operations of method 1900 may be implemented by a device such as a base station 105 or its components as described with reference to FIGS. 1 and 2. For example, the operations of method 1900 may be performed by the base station cell acquisition manager as described herein. In some examples, the base station 105 may execute a set of codes to control the functional elements of the device to perform the functions described below. Additionally or alternatively, the base station 105 may perform aspects of the functions described below using special-purpose hardware.

At block 1905, the base station may transmit a first acquisition signal associated with a deployment of a first wireless protocol type and a second acquisition signal associated with a second wireless protocol type, wherein the deployment of the first and second wireless protocol types are frequency and time coupled with one another. In certain examples, the operations of block 1905 may be performed by the base station cell acquisition manager as described with reference to FIGS. 14 and 15.

At block 1910, the base station may transmit a second signal associated with the deployment of the first wireless protocol type, the second signal comprising information enabling a UE to complete cell acquisition of the deployment of the first wireless protocol type. In some cases, the information may comprise at least one of a bandwidth, a system frame number, a physical cell identifier, a deployment type indicator, a type of band deployment for the first wireless protocol type, or a system value tag associated with the second wireless protocol type. In certain examples, the operations of block 1910 may be performed by the base station cell acquisition manager as described with reference to FIGS. 14 and 15.

At block 1915, the base station may complete cell acquisition with one or more UEs. In certain examples, the operations of block 1915 may be performed by the base station cell acquisition manager as described with reference to FIGS. 14 and 15.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term eNB may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations).

The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   selecting, by a user equipment (UE) configured for cell acquisition for a first wireless protocol type using acquisition signals transmitted by deployments of the first wireless protocol type, to search for acquisition signals associated with a second wireless protocol type;
   receiving, from a base station, a first acquisition signal of a deployment of the second wireless protocol type, the deployment of the second wireless protocol type being frequency and time coupled with a deployment of the first wireless protocol type;
   performing a first portion of cell acquisition for a cell of the deployment of the first wireless protocol type based at least in part on the first acquisition signal;
   receiving a second signal associated with the cell of the deployment of the first wireless protocol type transmitted in resources determined based at least in part on the first portion of the cell acquisition;
   obtaining system information of the cell of the deployment of the first wireless protocol type based at least in part on the received second signal; and
   completing the cell acquisition based on the obtained system information.

2. The method of claim 1, wherein the performing the first portion of the cell acquisition comprises:
   determining at least one of a bandwidth, a system frame number, a physical cell identifier, a deployment type indicator, a type of band deployment for the first wireless protocol type, or a system value tag associated with the first wireless protocol type based on the first acquisition signal.

3. The method of claim 1, further comprising:
   determining resources for the receiving the first acquisition signal associated with the second wireless protocol type at least in part on resources of the cell that are not used for a system information signal associated with the first wireless protocol type.

4. The method of claim 1, wherein:
   the deployment of the first wireless protocol type comprises one of an enhanced machine-type communications deployment or a narrowband internet of things deployment and the deployment of the second wireless protocol type comprises the other of the enhanced machine-type communications deployment or the narrowband internet of things deployment.

5. The method of claim 1, wherein:
the first acquisition signal comprises at least one of a primary synchronization signal (PSS), a secondary synchronization signal (SSS), a physical broadcast channel (PBCH), a narrowband-PSS (NB-PSS), an NB-SSS, or an NB-PBCH.

6. The method of claim 1, wherein:
the performing the first portion of the cell acquisition comprises obtaining radio frame timing of the cell from the first acquisition signal; and
the completing the cell acquisition comprises combining multiple instances of at least one of the first acquisition signal or a physical broadcast channel associated with the deployment of the second wireless protocol type based on the obtained radio frame timing.

7. A method for wireless communication, comprising:
transmitting, by a base station, a first acquisition signal associated with a deployment of a first wireless protocol type and a second acquisition signal associated with a deployment of a second wireless protocol type, wherein the deployment of the first wireless protocol type is within a carrier bandwidth of and frequency and time coupled with the deployment of the second wireless protocol type; and
transmitting, by the base station, a second signal associated with the deployment of the first wireless protocol type, the second signal comprising information used for completing cell acquisition of the deployment of the first wireless protocol type.

8. The method of claim 7, further comprising:
transmitting, by the base station in the second signal, system information associated with the deployment of the first wireless protocol type, wherein the system information comprises at least one of physical broadcast channel position information, presence of the deployment of the first wireless protocol type, a carrier bandwidth of the first wireless protocol type, scheduling information, a deployment type, physical cell identifier, subframe validity information, frequency location information.

9. The method of claim 7, wherein
the first acquisition signal has at least one characteristic modified from the second signal used for completing cell acquisition of the first wireless protocol type.

10. The method of claim 9, wherein
the at least one characteristic comprises a cover code, a frequency raster position, a scrambling sequence, a sequence root, a sequence shift, a time position, or a payload size.

11. The method of claim 7, further comprising:
transmitting the second signal comprises transmitting multiple second signals concurrently using multiple frequency resources.

12. The method of claim 7, wherein
the information comprises at least one of a bandwidth, a system frame number, a physical cell identifier, a deployment type indicator, a type of band deployment for the first wireless protocol type, or a system value tag associated with the deployment of the second wireless protocol type.

13. An apparatus for wireless communication, in a system comprising:
a processor;
memory in electronic communication with the processor; and
instructions stored in the memory and operable, when executed by the processor, to cause the apparatus to:
select, by a user equipment (UE) configured for cell acquisition for a first wireless protocol type using acquisition signals transmitted by deployments of the first wireless protocol type, to search for acquisition signals associated with a second wireless protocol type;
receive, from a base station, a first acquisition signal of a deployment of the second wireless protocol type, the deployment of the second wireless protocol type being frequency and time coupled with a deployment of the first wireless protocol type;
perform a first portion of cell acquisition for a cell of the deployment of the first wireless protocol type based at least in part on the first acquisition signal;
receive a second signal associated with the cell of the deployment of the first wireless protocol type transmitted in resources determined based at least in part on the first portion of the cell acquisition;
obtain system information of the cell of the deployment of the first wireless protocol type based at least in part on the received second signal; and
complete the cell acquisition based on the obtained system information.

14. The apparatus of claim 13, wherein
the performing the first portion of the cell acquisition comprises: determining at least one of a bandwidth, a system frame number, a physical cell identifier, a deployment type indicator, a type of band deployment for the first wireless protocol type, or a system value tag associated with the second wireless protocol type based on the first acquisition signal.

15. The apparatus of claim 13, wherein the instructions are further executable by the processor to:
determine resources for the receiving the first acquisition signal associated with the second wireless protocol type at least in part on resources of the cell that are not used for a system information signal associated with the first wireless protocol type.

16. The apparatus of claim 13, wherein
the deployment of the first wireless protocol type comprises one of an enhanced machine-type communications deployment or a narrowband internet of things deployment and the deployment of the second wireless protocol type comprises the other of the enhanced machine-type communications deployment or the narrowband internet of things deployment.

17. The apparatus of claim 13, wherein
the first acquisition signal comprises at least one of a primary synchronization signal (PSS), a secondary synchronization signal (SSS), a physical broadcast channel (PBCH), a narrowband-PSS (NB-PSS), an NB-SSS, or an NB-PBCH.

18. The apparatus of claim 13, wherein
the performing the first portion of the cell acquisition comprises obtaining radio frame timing of the cell from the first acquisition signal; and
the completing the cell acquisition comprises combining multiple instances of at least one of the second signal or a physical broadcast channel associated with the deployment of the first wireless protocol type based on the obtained radio frame timing.

19. An apparatus for wireless communication, in a system comprising:
a processor;
memory in electronic communication with the processor; and
instructions stored in the memory and operable, when executed by the processor, to cause the apparatus to:

transmit, by a base station, a first acquisition signal associated with a deployment of a first wireless protocol type and a second acquisition signal associated with a deployment of a second wireless protocol type, wherein the deployment of the first wireless protocol type is within a carrier bandwidth of and frequency and time coupled with the deployment of the second wireless protocol type; and transmit, by the base station, a second signal associated with the deployment of the first wireless protocol type, the second signal comprising information used for completing cell acquisition of the deployment of the first wireless protocol type.

20. The apparatus of claim 19, wherein the instructions are further executable by the processor to:

transmit, by the base station in the second signal, system information associated with the deployment of the first wireless protocol type, wherein the system information comprises at least one of physical broadcast channel position information, presence of the deployment of the first wireless protocol type, bandwidth of the carrier, scheduling information, a deployment type, physical cell identifier, subframe validity information, frequency location information.

21. The apparatus of claim 19, wherein
the first acquisition signal has at least one characteristic modified from the second signal used for completing cell acquisition of the first wireless protocol type.

22. The apparatus of claim 21, wherein
the at least one characteristic comprises a cover code, a frequency raster position, a scrambling sequence, a sequence root, a sequence shift, a time position, or a payload size.

23. The apparatus of claim 19, wherein the instructions are further executable by the processor to:

transmit the second signal comprises transmitting multiple second signals concurrently using multiple frequency resources.

24. The apparatus of claim 19, wherein
the information comprises at least one of a bandwidth, a system frame number, a physical cell identifier, a deployment type indicator, a type of band deployment for the deployment of the first wireless protocol type, or a system value tag associated with the deployment of the first wireless protocol type.

* * * * *